United States Patent [19]
Fukuda

[11] Patent Number: 5,889,790
[45] Date of Patent: Mar. 30, 1999

[54] DATA COMMUNICATION METHOD AND DATA COMMUNICATION APPARATUS

[75] Inventor: Kunio Fukuda, Tokyo, Japan

[73] Assignee: Sony Corporation, Tokyo, Japan

[21] Appl. No.: 811,158

[22] Filed: Mar. 4, 1997

[30] Foreign Application Priority Data

Mar. 6, 1996 [JP] Japan .................................... 8-049278
Apr. 3, 1996 [JP] Japan .................................... 8-081804

[51] Int. Cl.$^6$ .............................. G08C 25/02; H04L 1/18
[52] U.S. Cl. ....................................... 371/32; 395/182.16
[58] Field of Search .................................. 371/32, 33, 35; 395/182.16

[56] References Cited

U.S. PATENT DOCUMENTS

| | | | |
|---|---|---|---|
| 4,439,859 | 3/1984 | Donnan ....................................... | 371/32 |
| 4,841,526 | 6/1989 | Wilson et al. ............................. | 371/32 |
| 5,165,091 | 11/1992 | Lape et al. ................................ | 370/216 |
| 5,210,751 | 5/1993 | Onoe et al. ............................... | 370/349 |
| 5,701,312 | 12/1997 | DeLuca et al. ............................ | 371/32 |
| 5,754,754 | 5/1998 | Dudley et al. ...................... | 395/182.16 |

*Primary Examiner*—Emmanuel L. Moise
*Attorney, Agent, or Firm*—Jay H. Maioli

[57] ABSTRACT

In a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame having the same format as that of the data frame and indicating a first request frame number $FB1(n)$ formed of a minimum (or maximum) frame number $FBM(n)$ among the frame numbers of the data frames which have not been received in response to frame numbers of first to nth data frames received, and transmitting from the transmission side data communication apparatus to the reception side data communication apparatus a data frame which the reception side data communication apparatus has not confirmed, in response to the first request frame number indicated by the received feedback frame, the feedback frame also indicates a second repeat frame number $FB2(n)$ formed of a frame number $\{FBM(n)+1\}$ [or $\{FBM(n)-1\}$] among the frame numbers of data frames which have not been received to a kth request frame number $FBk(n)$ formed of a frame number $\{FBM(n)+(k-1)\}$ [or $\{FBM(n)-(k-1)\}$] (where k is an integer exceeding 2) in response to frame numbers of the first to nth data frames which the reception side data communication apparatus has received.

16 Claims, 11 Drawing Sheets

DATA COMMUNICATION METHOD AND DATA COMMUNICATION APPARATUS

BACKGROUND OF THE INVENTION

1. Field of the Invention

The present invention relates to a data communication method of an error control for automatic repeat request system and a data communication apparatus therefor.

2. Description of the Related Art

An error control method for data communication includes an error control method of an automatic repeat request (ARQ) system suitable for application to a mobile data communication system in which a burst error occurs relatively frequently. According to this error control method of an automatic repeat request system, if a data frame transmitted from a transmission side communication apparatus (data communication apparatus) to a reception side transmission apparatus (data communication apparatus) has an error, then the transmission side communication apparatus transmits the data frame to the reception side communication apparatus again based on a re-transmission request from the reception side communication apparatus to the transmission side communication apparatus.

Although there are various kinds of error control methods of automatic repeat request, an error control method of an automatic repeat request system of a selective repeat (SR) system providing a high throughput will hereinafter be described by way of example. In theory, an apparatus employing the SR system requires a buffer memory of infinite size. Therefore, usually such an error control method of an automatic repeat request system of an SR system is not employed, but an improved method thereof is employed. For simplification of description, an error control method of automatic repeat request of an original SR system will be described.

An arrangement of an ARQ frame having the same format when it is a data frame and a feedback frame will be described with reference to FIG. 1A. This ARQ frame is formed of, for example, a 16-bit transmission data length indicating area a, an 8-bit transmission frame number area b, an 8-bit repeat request frame number area c, a 592-bit transmission data area d, and a 16-bit error detection code area e for all the areas a to d. In this arrangement, one frame is formed of 640 bits.

The transmission data length indicating area a is an area for indicating a data amount of the transmission data area d. This data amount can be set within the range from 0 to 592 bits, and in this case the data amount of the transmission data area d is 592 bits. The transmission frame number area b indicates a number of a frame to be transmitted (e.g., frame numbers 0 or 1 to 255). The repeat request frame number area c is used in a feedback frame transmitted from the reception side communication apparatus to the transmission side communication apparatus and indicates a number of a frame required to be transmitted again by the reception side communication apparatus (the smallest frame number among numbers of frames which the reception side communication apparatus has not received yet).

The error detection code e is a cyclic redundancy check (CRC) code (16 bits) according to ITU-T recommendations. This CRC code affects a 624-bit area from the transmission data length indicating area a to the transmission data area d.

An ARQ transmission chart according to the SR system presented when a transmission frame has an error will be described with reference to FIG. 1B. In FIG. 1B, numerals in rectangular frames of the data transmission side (transmission side communication apparatus) depict frame numbers of transmission frames. It is assumed that there are ten transmission frames 1 to 10 and the frame numbers 1 and 10 respectively depict the first transmission frame number and the last transmission frame number. An arrow pointing toward the lower right depicts a transmission frame transmitted from the transmission side communication apparatus to the reception side communication apparatus. An arrow pointing toward the upper right depicts a feedback frame transmitted from the reception side communication apparatus to the transmission side communication apparatus. A solid-line arrow depicts a frame having no transmission error. A broken-line arrow depicts a frame having a transmission error. A repeat request frame number of the feedback frame is depicted by a reference symbol R marked with a frame number. A reference symbol d depicts a round trip delay amount which indicates a time required for the transmission side communication apparatus to, after transmitting a transmission frame (data frame) therefrom to the reception side communication apparatus, receive a feedback frame from the reception side communication apparatus indicating whether or not the reception side communication apparatus has received the transmission frame correctly. In this example shown in FIG. 1B, the round trip delay amount d corresponds to four frame periods required for the transmission side communication apparatus to transmit four transmission frames.

Operations of the transmission side communication apparatus and the reception side communication apparatus will hereinafter be described with reference to FIG. 1B.

Operation of Transmission Side Communication Apparatus (1) Transmit transmission frames 1, 2, 3 and 4 successively.
(2) Receive a feedback frame including a response to the transmission frame 1 while transmitting the transmission frame 4. Since the repeat request frame number indicated by the feedback frame is 2, determine that the reception side communication apparatus has received the transmission frame 1 correctly.
(3) Receive a feedback frame including a response to the transmission frame 2 while transmitting a transmission frame 5. Since the repeat request frame number indicated by the feedback frame is 3, determine that the reception side communication apparatus has received the transmission frame 2 correctly.
(4) Receive a feedback frame including a response to the transmission frame 3 while transmitting a transmission frame 6. Since the repeat request frame number indicated by the feedback frame is 4, determine that the reception side communication apparatus has received the transmission frame 3 correctly.
(5) Receive a feedback frame including a response to the transmission frame 4 while transmitting a transmission frame 7. Since the repeat request frame number indicated by the feedback frame is 4 again, determine that the reception side communication apparatus has not received the transmission frame 4 correctly.
(6) Transmit the transmission frame 4 again.
(7) Since it is determined after four frame periods whether or not the reception side communication apparatus correctly receives the re-transmitted frame 4 transmit the succeeding frames 8, 9 and 10 successively.
(8) Receive the feedback frame including a response to the re-transmitted frame 4 while transmitting the last transmission frame 10. Since the repeat request frame number indicated by the feedback frame is 4, determine that the reception side communication apparatus has not yet received the transmission frame 4 correctly.

(9) Transmit the transmission frame 4 again.

(10) Since it is determined after four frame periods whether or not the reception side communication apparatus correctly receives the re-transmitted frame 4 transmit the succeeding frames 5, 6 and 7 successively.

(11) Receive the feedback frame including a response to the re-transmitted frame 4 while transmitting the last transmission frame 7. Since the repeat request frame number indicated by the feedback frame is 9, determine that the reception side communication apparatus has received the transmission frame 4 correctly and that the reception side communication apparatus has not received the transmission frame 9 correctly.

(12) Transmit the transmission frame 9 again.

(13) Since it is determined after four frame periods whether or not the reception side communication apparatus correctly receives the re-transmitted frame 9 transmit the succeeding frame 10.

(14) Since there is no frame to be transmitted after transmission of the transmission frame 10, transmit again the transmission frame 9 which has been requested once.

(15) Transmit the transmission frame 10. Receive a feedback frame including a response to the transmission frame 9 while transmitting the transmission frame 10. Since the repeat request frame number indicated by the feedback frame is 10, determine that the reception side communication apparatus has received the transmission frame 9 correctly.

(16) Since there is no frame to be transmitted after transmission of the transmission frame 10, transmit again the transmission frame 10 which is requested at present.

(17) Receive a feedback frame including a response to the transmission frame 10 while transmitting the transmission frame 10. Since the repeat request frame number indicated by the feedback frame is 11, determine that the reception side communication apparatus has received the transmission frame 10 correctly. Thus, the transmission side communication apparatus finishes its transmission of the transmission frames 1 to 10.

Operation of Reception Side Communication Apparatus (1) Since having received the transmission frames 1, 2 and 3 correctly, transmit successively feedback frames having the frame numbers 2, 3 and 4.

(2) Since having not received the transmission frame 4 correctly, repeatedly transmit the feedback frame whose repeat request frame number is 4 until correct reception of the transmission frame 4 occurs.

(3) Since having received the transmission frame 4 correctly, repeatedly transmit a feedback frame including a repeat request frame number set to a frame number next to 8 which is a maximum number of frame numbers of the correctly received transmission frames, i.e., a frame number 9 which is a minimum number among frame numbers of frames that have not been received, until receiving the transmission frame 9 correctly.

(4) Since having received the transmission frame 9 correctly, transmit the feedback frame including a repeat request frame number set to a frame number 10 in dictating the transmission frame requested to be transmitted next.

(5) Since having received the transmission frame 10 correctly, transmit the feedback frame including a repeat request frame number set to a frame number 11 indicting of the transmission frame requested to be transmitted next.

In the ARQ error control method of the SR system shown in FIG. 1B, since the transmission side communication apparatus transmits the transmission frames 1 to 10 to the reception side communication apparatus, the number N1 of the transmission frames practically transmitted is 16, while the number N2 of the transmission frames transmitted until the transmission side communication apparatus receives all the feedback frames for confirming correct transmission of all the transmission frames 1 to 10 after transmitting the first transmission fame is 20.

A throughput S defined by a ratio N0/N1 (N0 is the number of the transmission frames to be transmitted and N1 is the number of all the transmission frames practically transmitted from the transmission side communication apparatus to the reception side communication apparatus) is S=10÷16=0.625 in the example shown in FIG. 1B.

In the example shown in FIG. 1B, since the transmission side communication apparatus twice failed to correctly transmit the transmission frame 4 to the reception side communication apparatus and correctly transmitted the transmission frame 4 thereto once, it transmitted the transmission frame 4 thereto three times in total. Since the transmission side communication apparatus once failed to correctly transmit the transmission frame 9 to the reception side communication apparatus and correctly transmitted the transmission frame 9 thereto once, it transmitted the transmission frame 9 thereto two times in total. Further, although the transmission frames 5, 6, 7 could correctly be transmitted from the transmission side communication apparatus to the reception side communication apparatus successively after transmission of the transmission frame 4, they were transmitted again because of the round trip delay. The reason for this re-transmission results from the fact that the repeat request frame numbers of the feedback frames are 4 until the transmission frame 7 is transmitted again. This means that some of the transmission frames are transmitted uselessly. Thus, in the example shown in FIG. 1B, the throughput is considerably lowered. In general, the larger the round trip delay amount becomes, the more the throughput is lowered.

A general operation of the above ARQ transmission of the SR system shown in FIG. 1B will be described. Initially, the transmission side communication apparatus transmits the frames from the first predetermined frame number to the last predetermined frame number to the reception side communication apparatus in ascending order (or descending order). The reception side communication apparatus transmits a feedback frame including a repeat request frame number FB1(n) formed of a minimum frame number FBM(n) among frames which have not been received and having the same format as that of a transmission frame, to the transmission side in response to the frame numbers of the received first to nth frames. The transmission side communication apparatus transmits a transmission frame which the reception side communication apparatus has not correctly received, to the reception side communication apparatus in response to the repeat request frame number FB1(n) of the received feedback frame.

As described above, in a data communication method employing the ARQ transmission shown in FIGS. 1A and 1B, even when the transmission side communication apparatus correctly transmits a data frame to the reception side communication apparatus, the transmission side communication apparatus sometimes disadvantageously transmits the data frame repeatedly.

In the data communication method employing the ARQ transmission shown in FIGS. 1A and 1B, if the reception side communication apparatus frequently fails to correctly receive a transmitted data frame of a certain number from the transmission side communication apparatus at the beginning of the successive transmission of the data frames, then the reception side communication apparatus continues transmitting the feedback frame including the same repeat request number to the transmission side communication apparatus until correctly receiving the data frame of the requested frame number, thereby preventing the transmission side communication apparatus from determining whether or not the reception side communication apparatus could correctly receive all the data frames to be transmitted. Therefore, after the transmission side communication apparatus transmits all the data frames at least once, the transmission side communication apparatus must repeatedly transmit the data frames once transmitted until it can confirm correct reception thereof of all the data frames to be transmitted.

SUMMARY OF THE INVENTION

In view of such aspects, it is an object of the present invention to provide a data communication method which makes it possible to transmit a feedback frame indicating a request frame number from a reception side data communication apparatus to a transmission side data communication apparatus with an improved throughput of data frames transmitted from the transmission side data communication apparatus to the reception side data communication apparatus, in a data communication method of transmitting data frames from a first predetermined frame number to a last predetermined frame number from the transmission side data communication apparatus to the reception side data communication apparatus in an ascending order (or a descending order), transmitting from the reception side data communication apparatus to the transmission side data communication apparatus a feedback frame having a format including a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame.

It is another object of the present invention to provide a data communication method which can improve the throughput of the data frame from the transmission side data communication apparatus to the reception side data communication apparatus, in a data communication method of transmitting data frames from a first predetermined frame number to a last predetermined frame number from the transmission side data communication apparatus to the reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame.

It is further another object of the present invention to provide a data communication apparatus which makes it possible to transmit a feedback frame indicating a request frame number from a reception side data communication apparatus to a transmission side data communication apparatus with an improved throughput of data frames transmitted from the transmission side data communication apparatus to the reception side data communication apparatus, in a data communication apparatus employing a data communication method of transmitting data frames from a first predetermined frame number to a last predetermined frame number from the transmission side data communication apparatus to the reception side data communication apparatus in an ascending order (or a descending order), transmitting from the reception side data communication apparatus to the transmission side data communication apparatus a feedback frame having a format including a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame.

It is yet another object of the present invention to provide a data communication apparatus which can improve the throughput of the data frame transmitted from the transmission side data communication apparatus to the reception side data communication apparatus, in a data communication apparatus employing a data communication method of transmitting data frames from a first predetermined frame number to a last predetermined frame number from the transmission side data communication apparatus to the reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame.

According to an aspect of the present invention, in a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, the feedback frame also indicates a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}]( where k is an integer exceeding 2) in response to frame numbers of the first to nth data frames which the reception side data communication apparatus has received.

Moreover, in response to the first request frame number FB1(n) indicated by the received feedback frame and, the second to kth request frame numbers FB2(n) to FBk(n) indicated thereby, the transmission side data communication apparatus transmits data frames having the indicated frame numbers which the reception side data communication apparatus has not received to the reception side data communication apparatus.

DESCRIPTION OF THE PREFERRED EMBODIMENTS

A data communication method according to a first embodiment of the present invention will hereinafter be described with reference to the accompanying drawings. The data communication method of the first embodiment employs an error control method of an automatic repeat request (ARQ) system of a selective repeat (SR) system. An arrangement of an ARQ frame having the same format when it is a data frame and a feedback frame will be described with reference to FIG. 2A. This ARQ frame is formed of, for example, a 16-bit transmission data length indicating area a, an 8-bit transmission frame number area b, an 8-bit repeat request frame number area c, a 584-bit transmission data area d, an 8-bit next repeat request frame number area f and a 16-bit error detection code e for the areas a to d and f.

Figure 1A:
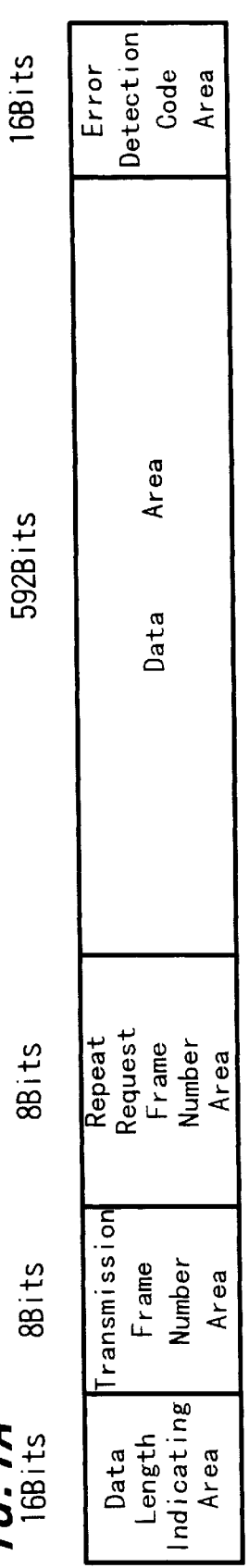
FIGS. 1A and 1B show an arrangement of an ARQ frame and an SR-ARQ transmission chart, respectively.
Figure 2A:
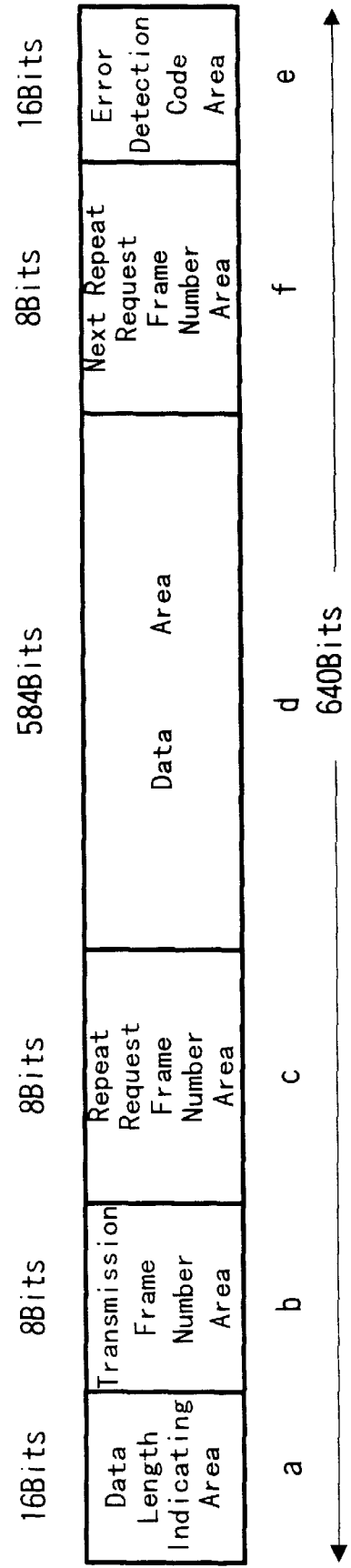
FIG. 2A is a diagram showing an arrangement of an ARQ frame according to a first embodiment of the present invention, by way of example.

The 8-bit next repeat request frame number area f shown in FIG. 2A is provided in the 592-bit data area d of the ARQ frame shown in FIG. 1A. Therefore, the data area d of the ARQ frame shown in FIG. 2A is formed of 592−8=584 bits.

The transmission data length indicating area a is an area for indicating a data amount of the transmission data area d. The data amount of the transmission data area d can be set within the range from 0 to 584 bits, and in the first embodiment the data amount thereof is 584 bits. The transmission frame number area b indicates a number of a frame to be transmitted (e.g., frame numbers 0 or 1 to 255). The repeat request frame number area c is used in a feedback frame transmitted from the reception side communication apparatus to the transmission side communication apparatus and indicates a number of a frame required next time by the reception side communication apparatus. The next repeat request frame number area f is used in a feedback frame transmitted from the reception side communication apparatus to the transmission side communication apparatus and indicates a number of a frame required at the time after the next transmission by the reception side communication apparatus.

The error detection code e is a cyclic redundancy check (CRC) code (16 bits) according to ITU-T recommendation. This CRC code effects a 624-bit area from the transmission data length indicating area a to the transmission data area d.

Figure 2B:
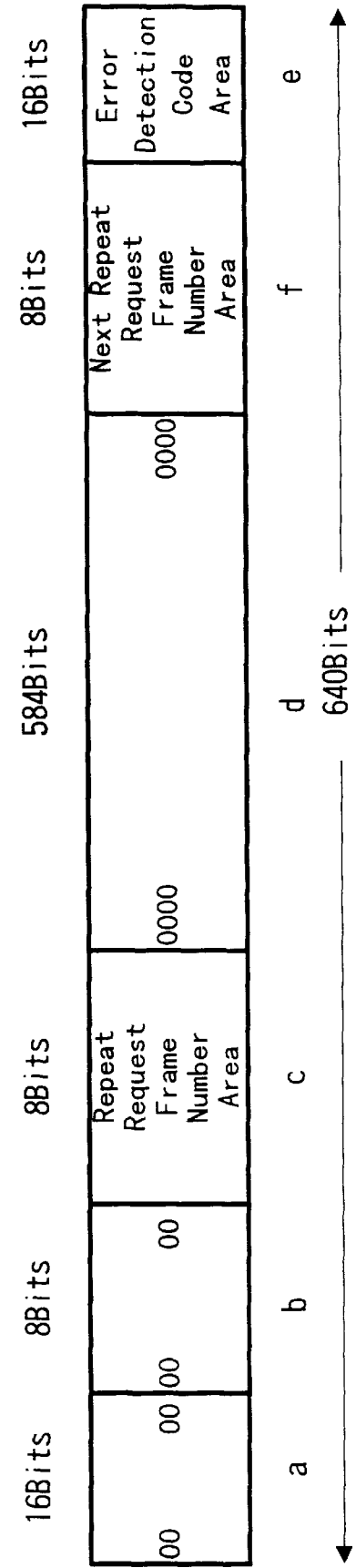
FIG. 2B is a diagram showing the ARQ frame according to the first embodiment which has no transmission data when it is used as a feedback frame.

FIG. 2B shows an arrangement of an ARQ frame transmitted as a feedback frame when the data length indicating area a, transmission frame number area b and the data area d have no transmission data. Since data of the data area d is replaced with a data having fixed values having no concern with a feedback information, i.e., with data in which all bits are set to 0 or 1, for example, it is possible to transmit the feedback frame from the reception side communication apparatus to the transmission side communication apparatus without any change of a frame format and without a reception rate being lowered. If the transmission side communication apparatus detects the data having all bits of the data area d set to 0 in the feedback frame transmitted from the reception side communication apparatus, then the transmission side communication apparatus can determine that the last 8 bits, i.e., 1 byte of the data area d indicates the next repeat request frame number. In this case, although the next repeat request frame number f is provided in the data area d, this does not lead to the lowering of the transmission data amount.

In the arrangement of the ARQ frame shown in FIG. 2A, the data frame transmitted from the transmission side communication apparatus to the reception side communication apparatus and the feedback frame transmitted from the reception side communication apparatus to the transmission side communication apparatus have the same format, i.e., a common format so that full-duplex communication can be realized. Most of practical communications other than a real time communication employ half-duplex communication. Therefore, the feedback frame of the ARQ frame according to the first embodiment constantly includes the repeat request frame number area c, while the feedback frame does not always include the next repeat request frame number area f and includes it only when it has no transmission data. As a result, it is possible to prevent the maximum transmission rate from being lowered.

Figure 3:
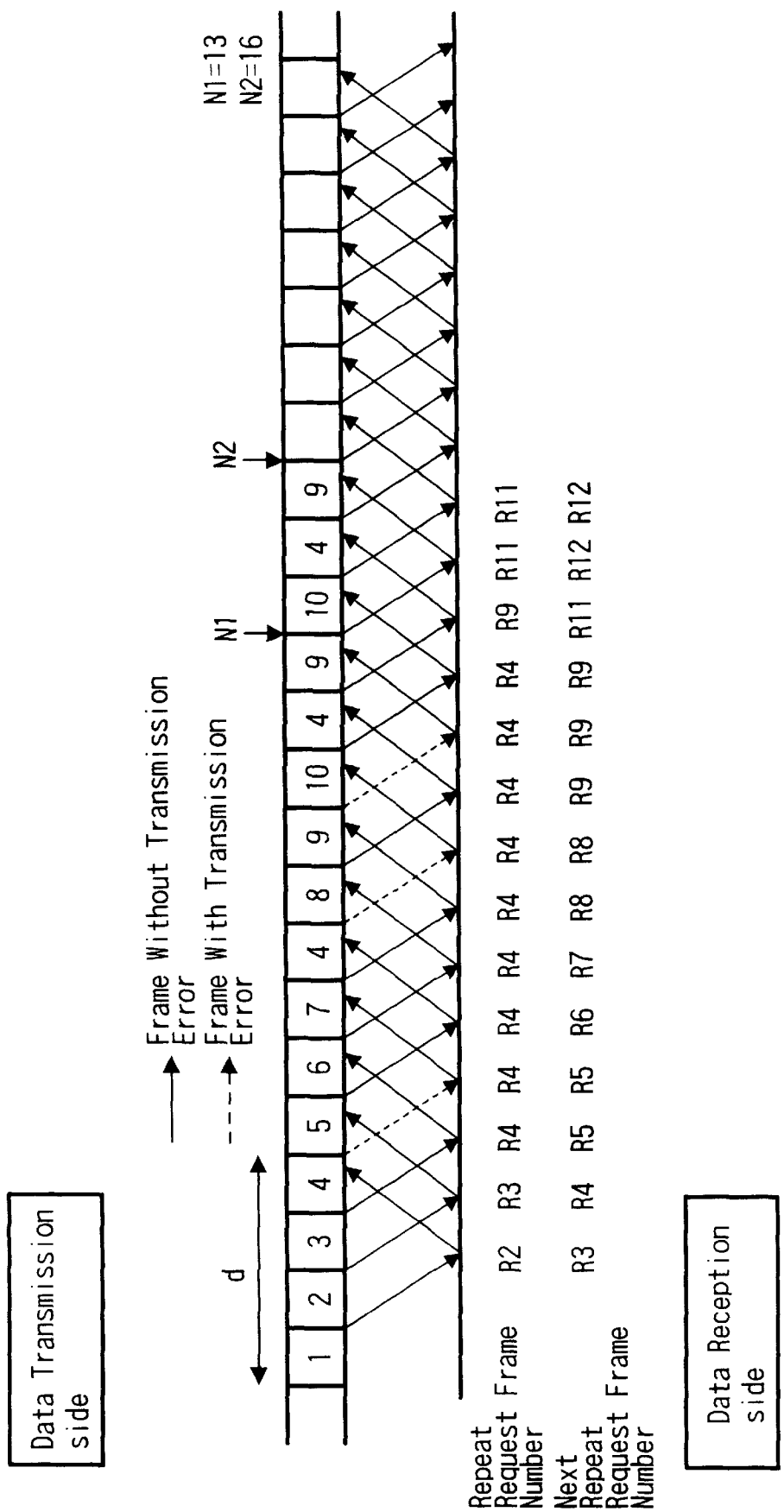
FIG. 3 is a diagram used to explain an ARQ transmission method of an SR system according to the first embodiment when a transmission frame has an error.

The repeat request frame number c and the next repeat request frame number f used in the feedback frame will be described with reference to FIG. 3 in the case of the ARQ transmission chart according to the SR system when a transmission frame has an error. In FIG. 3, numerals in rectangular frames aligned in a row on the data transmission side (transmission side communication apparatus) depict frame numbers of transmission frames. It is assumed that there are ten transmission frames 1 to 10 and the frame numbers 1 and 10 respectively depict the first transmission frame number and the last transmission frame number. An arrow pointing toward the lower right depicts a transmission frame transmitted from the transmission side communication apparatus to the reception side communication apparatus. An arrow pointing toward the upper right depicts a feedback frame transmitted from the reception side communication apparatus to the transmission side communication apparatus. A solid-line arrow depicts a frame having no transmission error. A broken-line arrow depicts a frame having a transmission error. A repeat request frame number of the feedback frame is depicted by a reference symbol R marked with a frame number on the data reception side. A reference symbol d depicts a round trip delay amount which indicates a time required for the transmission side communication apparatus to, after transmitting a transmission frame (data frame) therefrom to the reception side communication apparatus, receive a feedback frame from the reception side communication apparatus indicating whether or not the reception side communication apparatus has received the transmission frame correctly. In this embodiment, the round trip delay amount d corresponds to four frame periods required for the transmission side communication apparatus to transmit four transmission frames.

Figure 4:
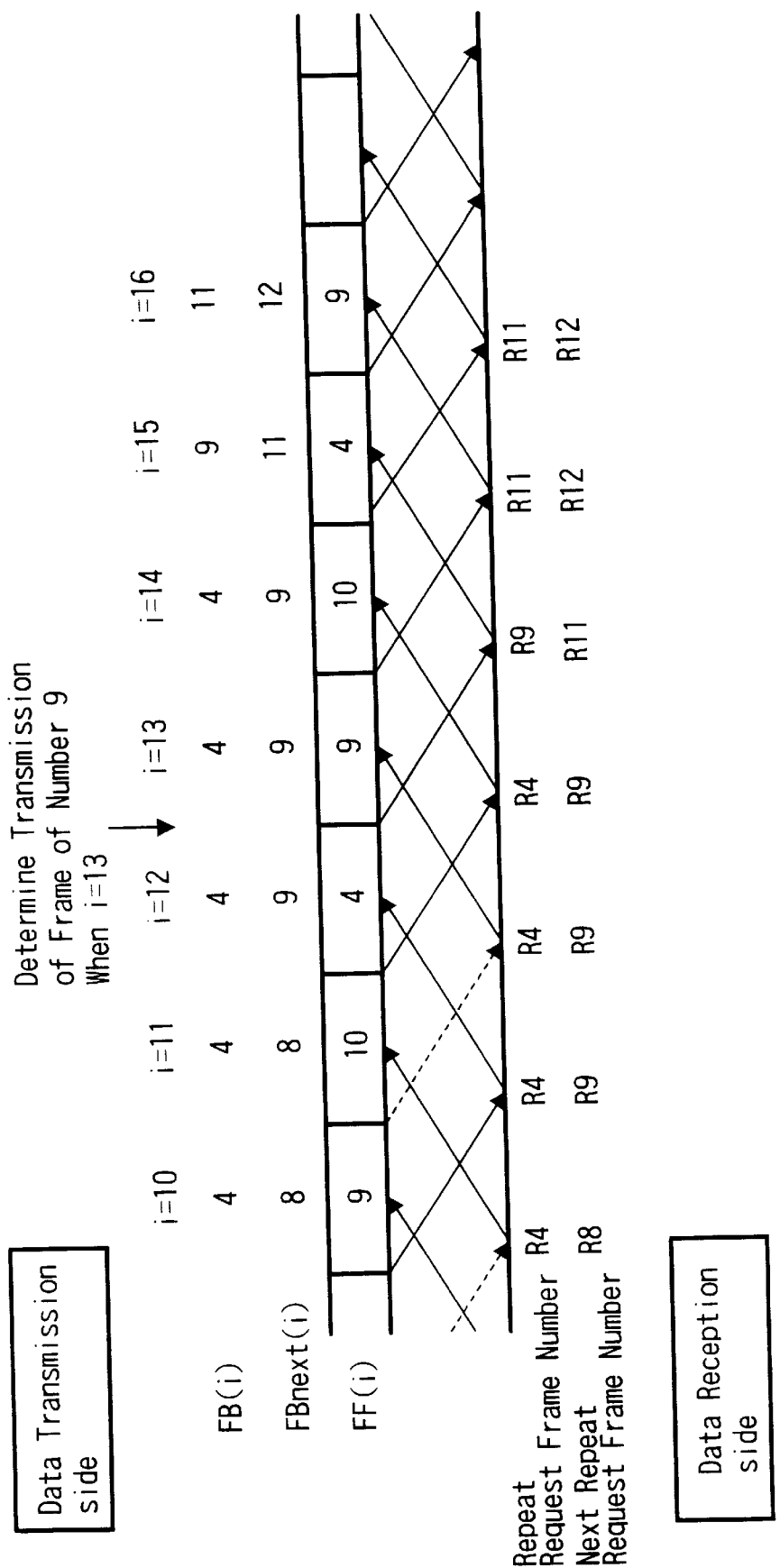
FIG. 4 is an enlarged diagram of FIG. 3, used to explain an operation of data frame transmission based on a repeat request frame number.

Before describing operations shown in FIG. 3 in detail, how to determine the repeat request frame number and the next repeat request frame number will be described with reference to FIG. 4 which shows a part of FIG. 3 in an enlarged scale. In FIG. 4, like parts and portions corresponding to those in FIG. 3 are marked with the same reference numerals. Respective reference symbols in FIG. 4 are defined as follows.

FF(i): a frame number of an ith data frame transmitted from the transmission side communication apparatus to the reception side communication apparatus FB(i): a repeat request frame number of a feedback frame received during transmission of the ith data frame FBnext(i): a next repeat request frame number of a feedback frame received during transmission of the ith data frame How the transmission side communication apparatus determines a frame number of a data frame when an (i+1)th transmission frame is transmitted by using the next repeat request frame number of the feedback frame received upon transmission of the ith data frame will be described.

When all the following three conditions are satisfied, FBnext(i) is set to the frame number of an (i+1)th data frame.

Condition 1: if the last data frame has already been transmitted; or if the data frame of the frame number FF(i)+1 is temporarily unable to be transmitted when the data frame FF(i+1) is to be transmitted Condition 2: FF(i)=FB(i−1)

Condition 3: FBnext(i)>FB(i)+1

Operations of the transmission side communication apparatus and the reception side communication apparatus will hereinafter be described with reference to FIG. 3.

Operation of Transmission Side Communication Apparatus

The following steps (1) to (9) are similar to those described with reference to FIG. 1B.

(1) Transmit transmission frames 1, 2, 3 and 4 successively.

(2) Receive a feedback frame including a response to the transmission frame 1 while transmitting the transmission frame 4. Since the repeat request frame number indicated by the feedback frame is 2, determine that the reception side communication apparatus has received the transmission frame 1 correctly.

(3) Receive a feedback frame including a response to the transmission frame 2 while transmitting a transmission frame 5. Since the repeat request frame number indicated by the feedback frame is 3, determine that the reception side communication apparatus has received the transmission frame 2 correctly.

(4) Receive a feedback frame including a response to the transmission frame 3 while transmitting a transmission frame 6. Since the repeat request frame number indicated by the feedback frame is 4, determine that the reception side communication apparatus has received the transmission frame 3 correctly.

(5) Receive a feedback frame including a response to the transmission frame 4 while transmitting a transmission frame 7. Since the repeat request frame number indicated by the feedback frame is 4 again, determine that the reception side communication apparatus has not received the transmission frame 4 correctly.

(6) Transmit the transmission frame 4 again.

(7) Since it is determined after four frame periods whether or not the reception side communication apparatus correctly receives the re-transmitted frame 4 transmit the succeeding frames 8, 9 and 10 successively.

(8) Receive the feedback frame including a response to the re-transmitted frame 4 while transmitting the last transmission frame 10. Since the repeat request frame number indicated by the feedback frame is 4, determine that the reception side communication apparatus has not yet received the transmission frame 4 correctly.

(9) Transmit the transmission frame 4 again (a portion indicated with i=12 in FIG. 4).

(10) Since the above three conditions are satisfied when i=12, transmit the transmission frame 9 indicated by a next repeat request frame number of a feedback frame received upon transmission of the twelfth data frame (a portion indicated with i=13 in FIG. 4)

(11) Transmit the transmission frame 10 (a portion indicated with i=14)

(12) Since there is no frame to be transmitted after transmission of the transmission frame 10, transmit the transmission frame 4 which is requested at present. Receive the feedback frame including a response to the re-transmitted frame 4 while transmitting the transmission frame 4. Since the repeat request frame number indicated by the feedback frame is 9, determine that the reception side communication apparatus has received the transmission frame 4 correctly (a portion indicated with i=15 in FIG. 4).

(13) Transmit the transmission frame 9. Since receiving a feedback frame whose the repeat request frame number indicates 11 during transmission of the transmission frame 9, determine that the reception side communication apparatus has received the transmission frame 10 correctly (a portion indicated with i=16 in FIG. 4)

Operation of Reception Side Communication Apparatus

The reception side communication apparatus constantly sets as the repeat request frame number of the feedback frame a frame number of a data frame which it requests the transmission side communication apparatus to transmit next time, and also sets as a next repeat request frame number of the feedback frame a frame number of a data frame which it requests the transmission side communication apparatus to transmit at a time after the next. The reception side communication apparatus transmits the feedback frame to the transmission side communication apparatus.

(1) Since having received the transmission frames 1, 2 and 3 correctly, successively transmit feedback frames respectively including the repeat request frame numbers set to 2, 3 and 4 and the next repeat request frame numbers set to 3, 4 and 5 to the transmission side communication apparatus.

(2) Since having not received the transmission frame 4 correctly, repeatedly transmit the feedback frame whose repeat request frame number is 4 and whose next repeat request frame number is still 5 until correct reception of the transmission frame 4.

(3) Since having received the transmission frame 4 correctly, transmit a feedback frame including a repeat request frame number set to a frame number next to 8 which is a maximum number of frame numbers of the correctly received transmission frames, i.e., a frame number 9 which is a minimum number among frame numbers of frames that have not been received, and including a next repeat request frame number set to 11.

(4) Since having received the transmission frame 9 correctly, transmit the feedback frame including a repeat request frame number set to a frame number 11 of the transmission frame requested to be transmitted next and including a next repeat request frame number set to a frame number 12.

Even if, when the feedback frame of the ARQ frame includes not only the repeat request frame number but also the next repeat request frame number, the reception side communication apparatus frequently fails to correctly receive the data frames transmitted from the transmission side communication apparatus thereto at the beginning of the transmission and hence repeatedly transmits the feedback frame indicating the repeat request, then it is possible for the transmission side communication apparatus to determine up to which data frame the reception side communication apparatus could correctly receive data frames after the reception side communication apparatus had failed to correctly receive the data frame from the transmission side communication apparatus. Therefore, useless retransmissions of data frames from the transmission side communication apparatus to the reception side communication apparatus (e.g., re-transmission of the data frames 5, 6, 7 in the example shown in FIG. 1B) can be avoided.

In the ARQ error control method of SR system according to the first embodiment shown in FIGS. 3 and 4, when the transmission side communication apparatus transmits the transmission frames 1 to 10 to the reception side communication apparatus, the number N1 of the transmission frames practically transmitted is 13, while the number N2 of the transmission frames transmitted until the transmission side communication apparatus receives all the feedback frames for confirming correct transmission of all the transmission frame 1 to 10 after transmitting the first transmission fame is 16.

A throughput S defined by a ratio N0/N1 (N0 is the number of the transmission frames to be transmitted and N1 is the number of all the transmission frames practically transmitted from the transmission side communication apparatus to the reception side communication apparatus) is S=10÷13=0.769 in the first embodiment shown in FIGS. 3 and 4. Study of this result reveals that the throughput S obtained in the first embodiment is improved by 23% as compared with the throughput S of 0.625 obtained in the example shown in FIG. 1B.

Figure 1B:
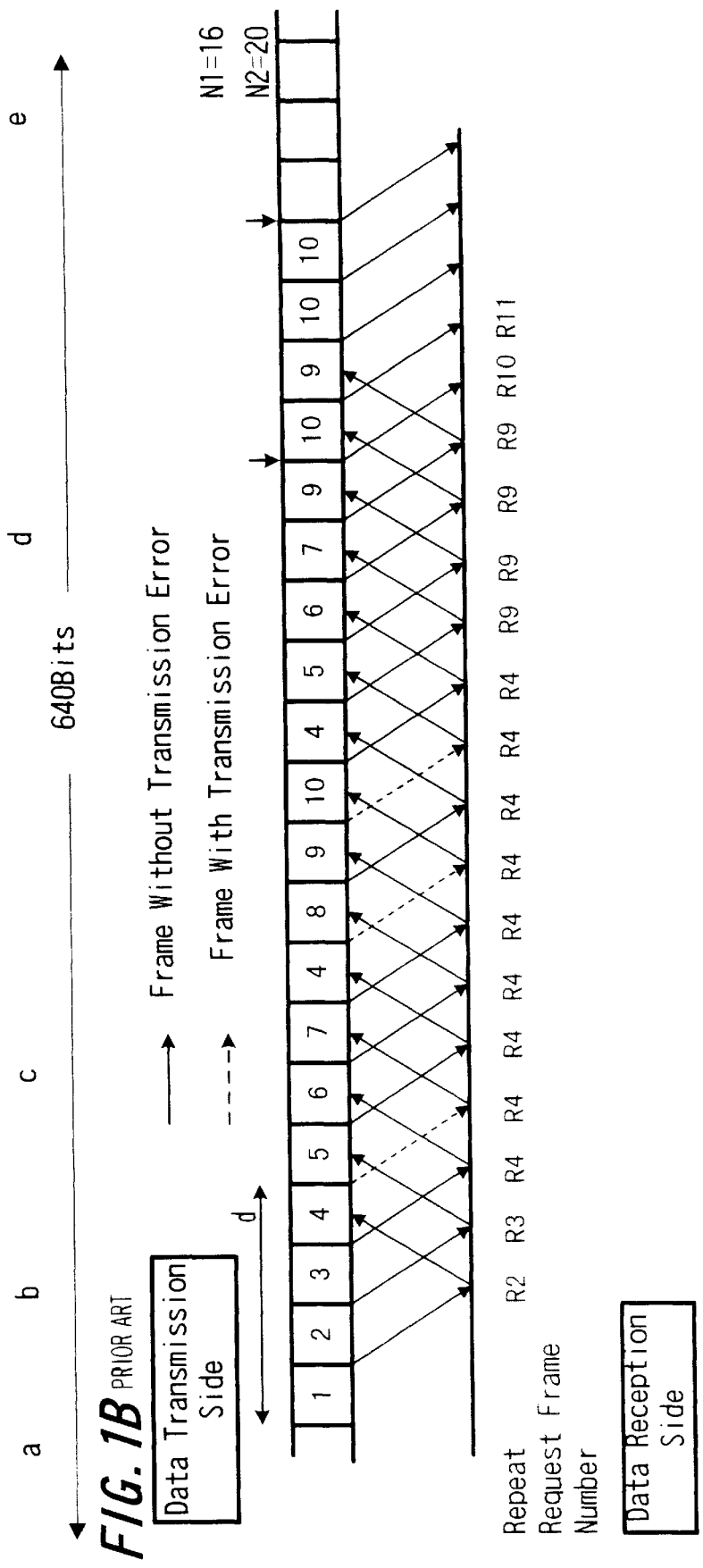
Figure 5:
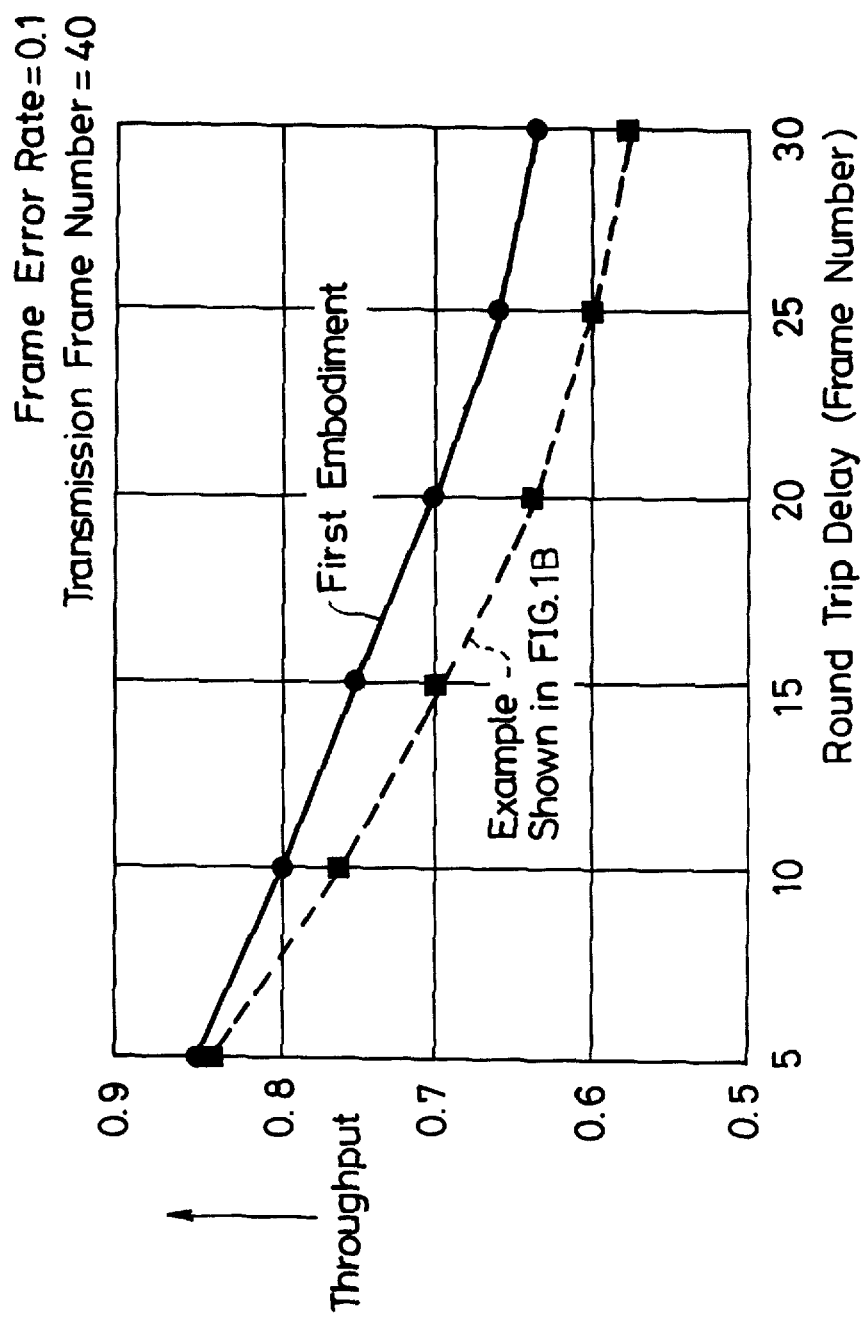
FIG. 5 is a characteristic graph of round trip delay versus to throughput characteristics obtained in the first embodiment and an example shown in FIG. 1A.

FIG. 5 is a graph showing characteristic curves of a round trip delay amount d (number of frame) versus a throughput S obtained in the first embodiment and in the example shown in FIG. 1B. In FIG. 5, the characteristic curves are obtained by calculating values of the throughput S respectively obtained when the round trip delay amount d is valued at to 5, 10, 15, 20, 25, and 30. In this calculation, it is assumed that a frame error rate is 0.1 and a total number of frames is 40. Study of the characteristic graph of FIG. 5 reveals that the larger the round trip delay amount d becomes, the more the throughput S obtained in the first embodiment is improved as compared with that obtained in the example shown in FIG. 1B. For example, when the round trip delay amount d is 20, the throughput S obtained in the first embodiment is improved by 6.2% as compared with that in the example shown in FIG. 1B. If the data communication method according to the first embodiment is applied to a personal handy-phone system (PHS), a transmission rate therein is improved by about 1.8 kb/sec on the assumption that the maximum transmission rate obtained when an ARQ error control method is employed is 30 kb/sec. Contrary, the smaller the round trip delay amount d becomes the less the throughput S obtained in the first embodiment is improved as compared with that obtained in the example shown in FIG. 1B.

Figure 6:
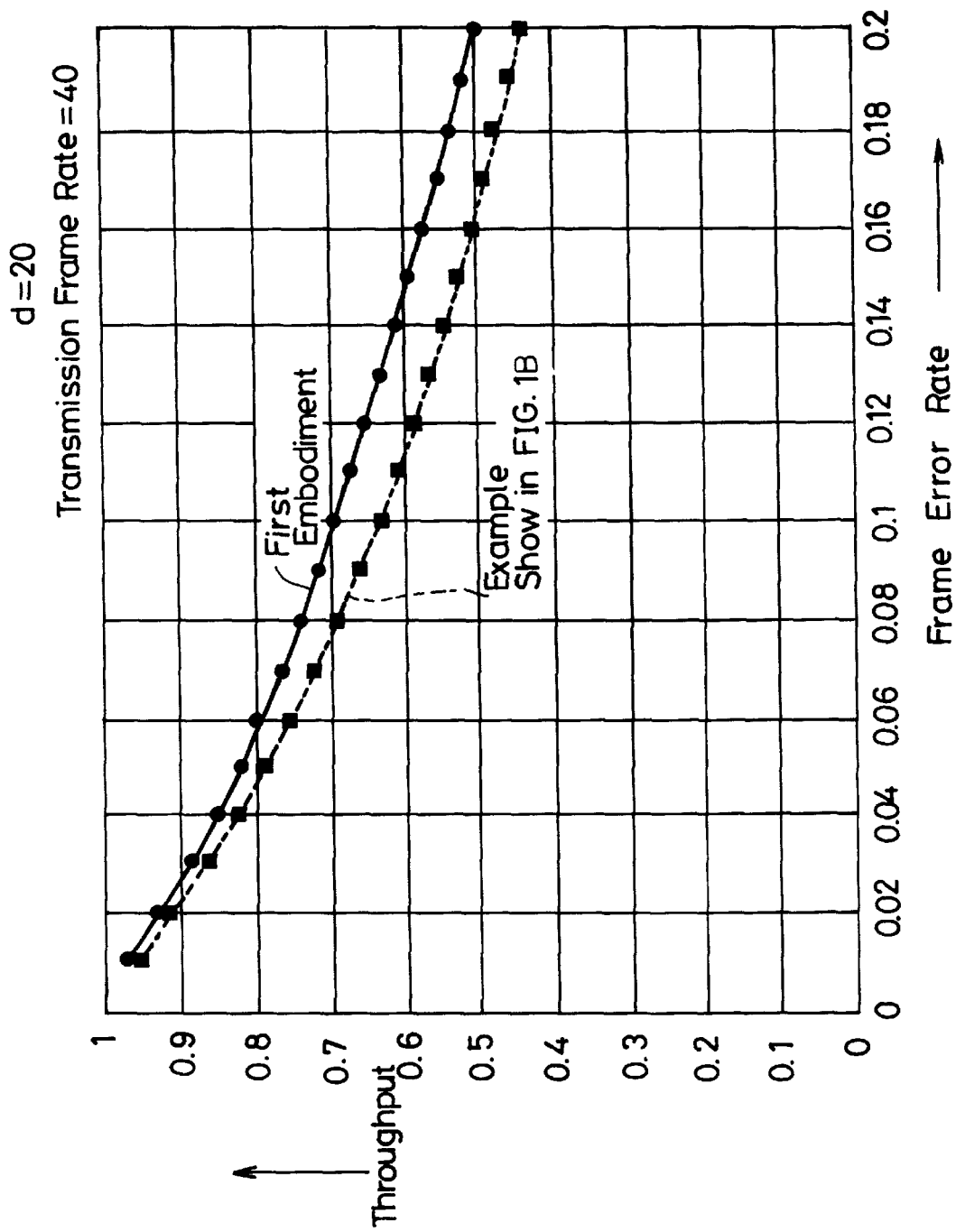
FIG. 6 is a characteristic graph of frame error rate versus throughput characteristics obtained in the first embodiment and an example shown in FIG. 1A.

FIG. 6 is a graph showing characteristic curves of the frame error rate versus the throughput S in the first embodiment and in the example shown in FIG. 1B. In FIG. 6, the characteristic curves are obtained by calculating values of the throughput S respectively obtained when the frame error rate is changed from 0 to 0.2 by units of 0.02. In this calculation, it is assumed that a round trip delay amount d is 20 and a total number of transmission frames is 40. Study of the characteristic graph of FIG. 6 reveals that the larger the frame error rate becomes, the more the throughput S obtained in the first embodiment is improved as compared with that obtained in the example shown in FIG. 1B.

A general data communication method will subsequently be described. This general data communication method is as follows. The transmission side data communication apparatus transmits to the reception side data communication apparatus data frames from the first predetermined frame number to the last predetermined frame number in an ascending order (or in a descending order). The reception side data communication apparatus transmits to the transmission side data communication apparatus the feedback frame including the first repeat request frame number FB1 (n) formed of the minimum (or maximum) frame number FBM(n) among the frame numbers of the data frames which it has not received yet, in response to the frame numbers of the first to nth data frames which it has already received. The transmission side data communication apparatus transmits to the reception side data communication apparatus again the data frame of the frame number which the reception side data communication apparatus has not correctly received, in response to the first repeat request frame number FB1(n) indicated by the received feedback frame.

In response to the frame numbers of the first to nth data frames received by the reception side data communication apparatus, the reception side data communication apparatus sets in the feedback frame the second repeat request frame number FB2(n) formed of the frame numbers {FBM(n)+1}

[or {FBM(n)−1}] of the data frames which have not been received to the kth repeat request frame number FBk(n) (where k is an integer exceeding 1) formed of the frame numbers {FBM(n)+(k−1)} [or {FBM(n)−(k−1)}] of the data frames which have not been received.

In response to the first repeat request frame number FB1(n) of the received feedback frame and the second repeat request frame number FB2(n) to the kth repeat request frame number FBk(n), the transmission side data apparatus transmits the data frame of the frame numbers which the reception side data communication apparatus has not correctly received, to the reception side data communication apparatus Assuming that the frame number of the first data frame transmitted from the transmission side data communication apparatus to the reception side data communication apparatus in response to the first repeat request frame number FB1(n) of the received feedback frame and the second repeat request frame number FB2(n) to the kth repeat request frame number FBk(n) thereof is FF(i) and that the first repeat request frame number and the second to kth repeat request frame number indicated by the feedback frame received during transmission of the data frame of the frame number FF(i) are respectively FB1(n) and FB2(n) to FBk(n) in response thereto, the frame number of the data frame to be transmitted at an (i+1)th frame is set to FBk(i) subject to satisfaction of all the following conditions.

The kth Conditions (1): if the data frame of the last predetermined frame number has already been transmitted; or if the data frame {FF(i)+1} [or {FF(i)−1}] cannot temporarily be transmitted as the data frame of the frame number FF(i+1) to be transmitted at the (i+1)th frame.
(2): {FF(i)=FB(k−1)(i−1)} [or {FF(i)=FB(k−1)(i+1)}]
(3): {FBk(i)>FB(k−1)(i)+1} [or {FBk(i)<FB(k−1)(i)−1}]

The frame number of the data frame to be transmitted at an (i+1)th frame is set to FB(k−1)(i) when the above kth conditions are not satisfied but the following (k−1)th conditions are satisfied.

The (k−1)th Conditions (1): if the data frame of the last predetermined frame number has already been transmitted; or if the data frame {FF(i)+1} [or {FF(i)−1}] cannot temporarily be transmitted as the data frame of the frame number FF(i+1) to be transmitted at the (i+1)th frame.
(2): {FF(i)=FB(k−2)(i−1)} [or {FF(i)+1=FB(k−2)(i+1)}]
(3): {FB(k−1)(i)>FB(k−2)(i)+1}
  [or {FB(k−1)(i)<FB(k−2)(i)−1}]

The frame number of the data frame to be transmitted at an (i+1)th frame is set to FB2(i) when the above kth, (k−1)th, . . . , third and the second conditions are not satisfied.

(1): if the data frame of the last predetermined frame number has already been transmitted; or if the data frame {FF(i)+1} [or {FF(i)−1}] cannot temporarily be transmitted as the data frame of the frame number FF(i+1) to be transmitted at the (i+1)th frame.
(2): {FF(i)=FB1(i−1)} [or {FF(i)+1=FB1(i+1)}]
(3): {FB2)(i)>FB1(i)+1} [or {FB2)(i)<FB1(i)−1}]

The frame number of the data frame to be transmitted at an (i+1)th frame is set to FB2(i) when the above kth, (k−1)th, . . . , third conditions are not satisfied but the second conditions are satisfied.

According to the first embodiment, since in the error control method of the automatic repeat request system of the selective request system the feedback frame supplied from the reception side communication apparatus to the transmission side communication apparatus includes not only the repeat request frame number but also the next repeat request frame number, even if the reception side communication apparatus frequently fails to correctly receive the data frames from the beginning of the data frame transmission from the transmission side communication apparatus thereto and hence repeatedly requests the transmission side communication apparatus to transmit again a data frame which it failed to correctly receive, then it is possible for the transmission side communication apparatus to determine which data frames the reception side communication apparatus has correctly received. Therefore, it is possible to prevent the transmission side communication apparatus from uselessly re-transmitting the data frames once transmitted therefrom to the reception side communication apparatus because of such determinations by the transmission side communication apparatus. Especially, when such data communication is carried out via a satellite circuit. The round trip delay amount reaches a considerable amount of thirty five frames, which is a considerably long delay amount (assuming that one frame is formed of 640 bits and a transmission rate is 32 kb/sec, then the delay amount of thirty five frames is equivalent to 700 msec), employment of the data communication method according to the present invention remarkably improves the throughput. While the method with the numbers of the repeat request frame number area set to k=2 has been generally described in the first embodiment, when the total number of the transmission frames is large, the effect of the present invention can be better achieved by setting the value of k to 3 or larger.

When the feedback frame does not include any transmission data, even if the next repeat request frame number area is provided in the data area, it does not lower the maximum transmission rate but it improves the throughput. When this method according to the first embodiment of the present invention is employed, it is unnecessary to considerably add/change software/hardware to be added to the data communication apparatus used in the example shown in FIG. 1B in order for the reception side communication apparatus to add the next repeat request frame number area to the feedback frame transmitted to the transmission side communication apparatus and in order for the transmission side communication apparatus to determine the frame number of the data frame based on the next repeat request frame number.

A data communication method according to a second embodiment of the present invention will hereinafter be described with reference to the accompanying drawings. The data communication method according to the second embodiment employs the error control method of an automatic repeat request system of a selective repeat system providing a high throughput similar to those presented by the method shown in FIG. 1B and the first embodiment. An arrangement of an ARQ frame having the same format when it is a data frame and a feedback frame will be described with reference to FIGS. 7A and 7B. This ARQ frame is formed of, for example, a 16-bit transmission data length indicating area a, an 8-bit transmission frame number area b, an 8-bit repeat request frame number area c (shown in FIG. 7A) or 8-bit next repeat request frame number area f (shown in FIG. 7B), a 591-bit transmission data area d, a 1-bit repeat request identifier area g and a 16-bit error detection code e for the areas a, b, c (or f), d and g.

It depends upon a rule which will be described later on whether the repeat request frame number area c or the next repeat request frame number area f is set in an 8-bit area between the transmission frame number b and the data area d. When the repeat request frame number area c is set therein, a value of the 1-bit repeat request identifier area g is set to g=0 (or g=1). When the next repeat request frame number area f is set therein, the value of the 1-bit repeat request identifier area g is set to g=1 (or g=0). Thus, it is possible to control whether the repeat request frame number area c or the next repeat request frame number area f is set in the 8-bit area between the transmission frame number b and the data area d.

Figure 7A:
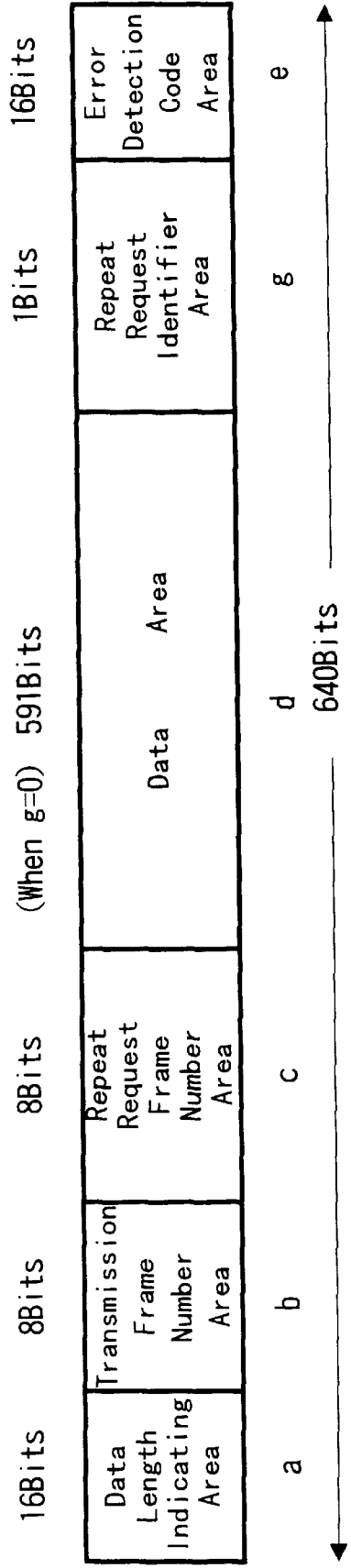
FIGS. 7A and 7B are diagrams showing an arrangement of an ARQ frame according to a second embodiment of the present invention, by way of example.
Figure 7B:
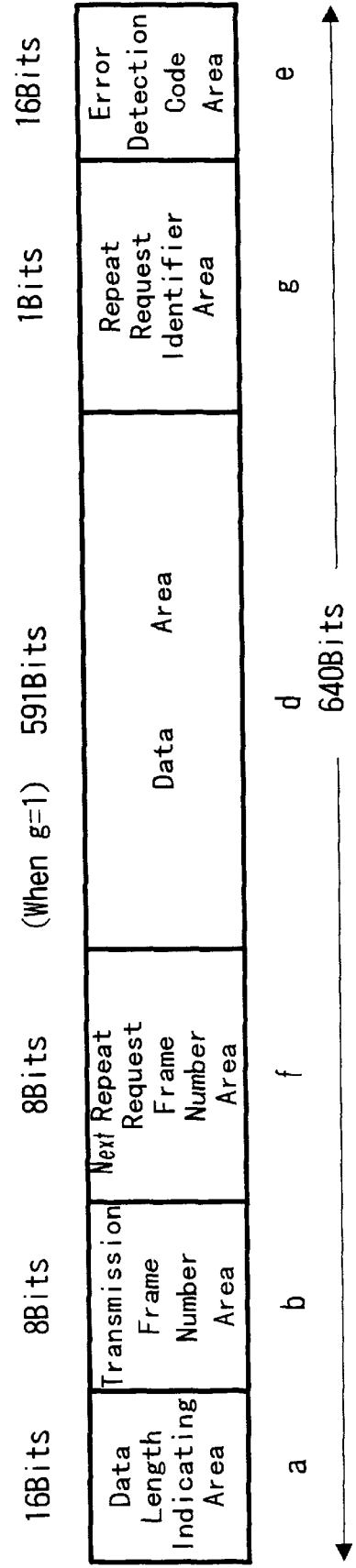

The 1-bit next repeat request identifier area g shown in FIGS. 7A and 7B is provided in the 592-bit data area d of the ARQ frame shown in FIG. 1A. Therefore, the data area d of the ARQ frame shown in FIGS. 7A and 7B is formed of 592−1=591 bits. Since the data amount of the data area d according to this second embodiment is slightly larger as compared with that according to the first embodiment shown in FIG. 2A, this area format according to this second embodiment is more advantageous in full-duplex communication with data in the data area d of the feedback frame as compared with that of the first embodiment.

The transmission data length indicating area a is an area for indicating a data amount of the transmission data area d. The data amount of the transmission data area d can be set within the range from 0 to 591 bits at one bit intervals, and in the second embodiment the data amount thereof is 591 bits. The transmission frame number area b indicates a number of a frame to be transmitted (e.g., frame numbers 0 or 1 to 255). The repeat request frame number area c is used in a feedback frame transmitted from the reception side communication apparatus to the transmission side communication apparatus and indicates a number of next frame required by the reception side communication apparatus. The next repeat request frame number area f is used in a feedback frame transmitted from the reception side communication apparatus to the transmission side communication apparatus and indicates a number of a frame required after the next by the reception side communication apparatus.

The error detection code e is a cyclic redundancy check (CRC) code (16 bits) according to ITU-T recommendations. This CRC code affects in total a 624-bit area formed of the areas a, b, c (or f), d and g.

Figure 8:
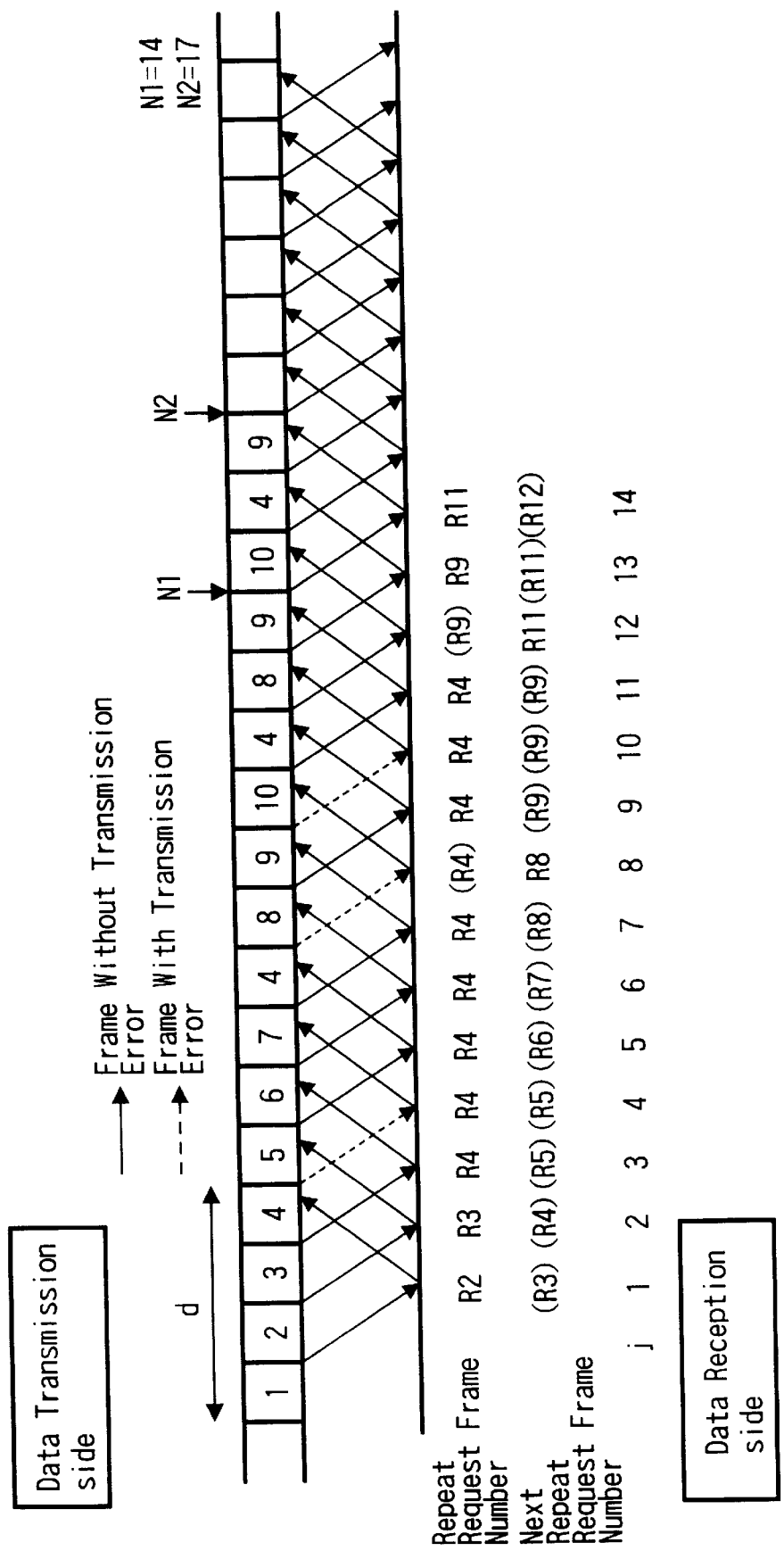
FIG. 8 is a diagram showing an arrangement of an ARQ frame according to the second embodiment of the present invention, by way of example.

The repeat request frame number c and the next repeat request frame number f used in the feedback frame will be described with reference to FIG. 8 in case of the ARQ transmission chart according to the SR system when a transmission frame has an error. In FIG. 8, numerals in rectangular frames aligned in a row on the data transmission side (transmission side communication apparatus) depict frame numbers of transmission frames. It is assumed that there are ten transmission frames 1 to 10 and the frame numbers 1 and 10 respectively depict the first transmission frame number and the last transmission frame number. An arrow pointing toward the lower right depicts a transmission frame transmitted from the transmission side communication apparatus to the reception side communication apparatus. An arrow pointing toward the upper right depicts a feedback frame transmitted from the reception side communication apparatus to the transmission side communication apparatus. A solid-line arrow depicts a frame having no transmission error. A broken-line arrow depicts a frame having a transmission error. A repeat request frame number of the feedback frame is depicted by a reference symbol R marked with a frame number on the data reception side. A reference symbol R marked with a frame number and in parenthesis is a next repeat request frame number which the reception side communication apparatus has not transmitted to the transmission side communication apparatus. A reference symbol d depicts a round trip delay amount which indicates a time required for the transmission side communication apparatus to, after transmitting a transmission frame (data frame) therefrom to the reception side communication apparatus, receive a feedback frame from the reception side communication apparatus indicating whether or not the reception side communication apparatus has received the transmission frame correctly. In the second embodiment, the round trip delay amount d corresponds to the four frame periods required for the transmission side communication apparatus to transmit four transmission frames.

Figure 9:
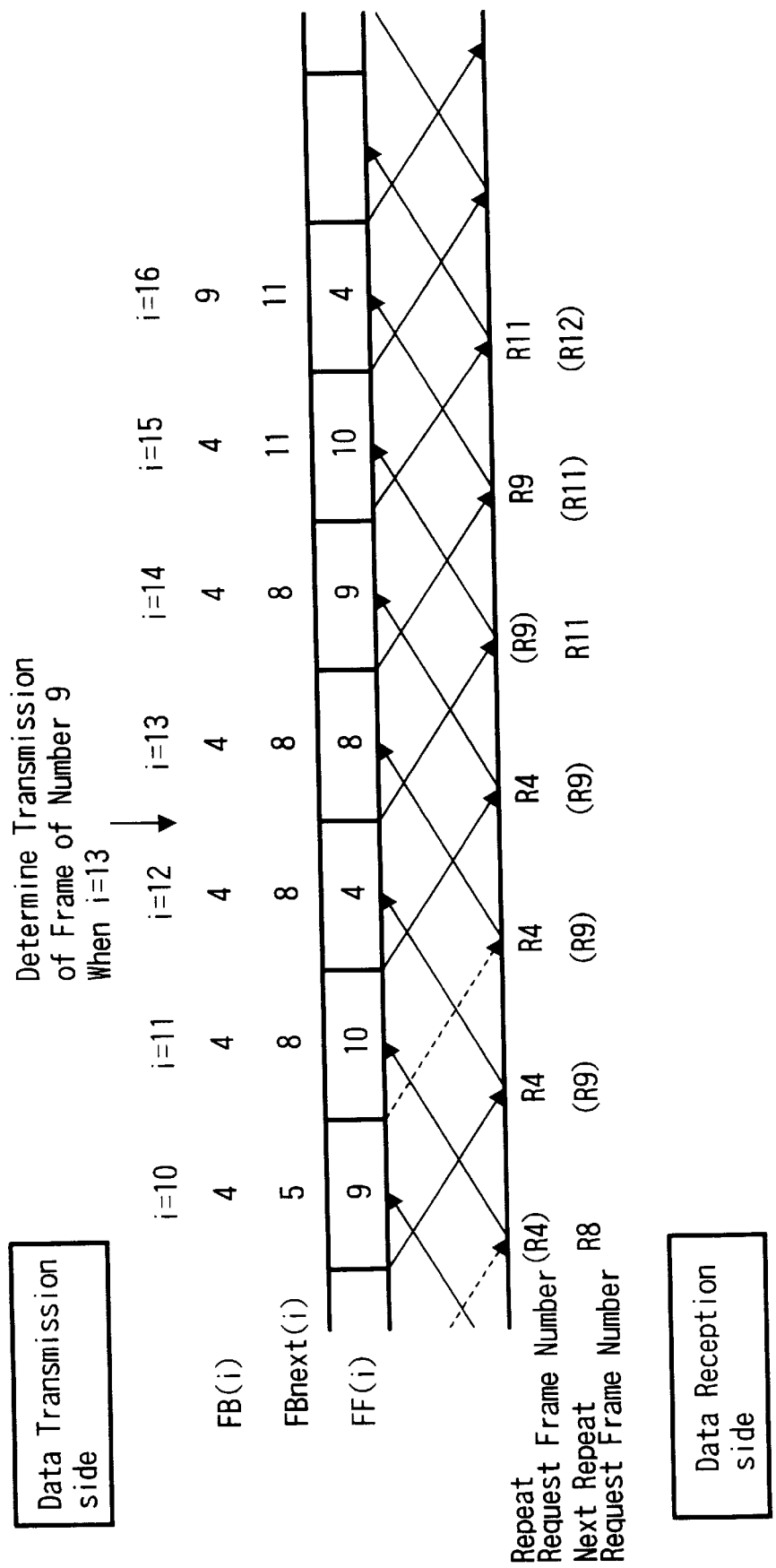
FIG. 9 is an enlarged diagram of FIG. 8 used to explain an ARQ transmission method of an SR system according to the second embodiment when a transmission frame has an error

Before describing operations shown in FIG. 8 in detail, how to determine the repeat request frame number and the next repeat request frame number will be described with reference to FIG. 9 which shows a part of FIG. 8 in an enlarged scale. In FIG. 9, like parts and portions corresponding to those in FIG. 8 are marked with the same reference numerals. Respective reference symbols in FIG. 9 are defined as follows.

FF(i): a frame number of an ith data frame transmitted from the transmission side communication apparatus to the reception side communication apparatus FB(i): a repeat request frame number of a feedback frame received during transmission of the ith data frame FBnext(i): a next repeat request frame number of a latest repeat request frame number FB(i) requested by the reception side communication apparatus received during transmission of the ith data frame It will be described how to determine whether the feedback frame including the repeat request frame number area or the next repeat request frame number area is to be transmitted from the reception side communication apparatus to the transmission side communication side apparatus. Usually, the feedback frame including the repeat request frame number area is transmitted. However, only when the following two conditions are satisfied, the feedback frame including the next repeat request frame number area is transmitted.

Condition (1): j mod α=0
(the feedback frame including the next repeat request frame number area is transmitted once in α transmission times. α>1 is established and j depicts the number taken from the order in which the reception side communication apparatus transmits frames)

Condition (2): next repeat request frame number>repeat request frame number+1

Operations of the transmission side communication apparatus and the reception side communication apparatus will hereinafter be described with reference to FIG. 8.

Operation of Transmission Side Communication Apparatus

Since the transmission side communication apparatus is prevented from receiving the feedback frame including both of the repeat request frame number area and the next repeat request frame number in the second embodiment, the transmission side communication apparatus is provided with memories for respectively storing therein the repeat request frame number and the next repeat request frame number which are constantly replaced with new frame numbers.

(1) Transmit transmission frames 1, 2, 3 and 4 successively.

(2) Receive a feedback frame including a response to the transmission frame 1 while transmitting the transmission frame 4. Since the repeat request frame number indicated by the feedback frame is 2, determine that the reception side communication apparatus has received the transmission frame 1 correctly.

(3) Receive a feedback frame including a response to the transmission frame 2 while transmitting a transmission frame 5. Since the repeat request frame number indicated by the feedback frame is 3, determine that the reception side communication apparatus has received the transmission frame 2 correctly.

(4) Receive a feedback frame including a response to the transmission frame 3 while transmitting a transmission frame 6. Since the repeat request frame number indicated by the feedback frame is 4, determine that the reception side communication apparatus has received the transmission frame 3 correctly.

(5) Receive a feedback frame including a response to the transmission frame 4 while transmitting a transmission frame 7. Since the repeat request frame number indicated by the feedback frame is 4 again, determine that the reception side communication apparatus has not received the transmission frame 4 correctly.

(6) Transmit the transmission frame 4 again.

(7) Since it is determined after four frame periods whether or not the reception side communication apparatus correctly receives the transmission frame 4 transmitted again, transmit the succeeding frames 8, 9 and 10 successively.

(8) Receive the feedback frame including a repeat request frame number 4 while transmitting the last transmission frame 10. The next repeat request frame number indicated by the feedback frame is 8.

(9) Since there is no transmission frame whose frame number exceeds 10 and the latest repeat request frame number stored in the memory is 4, transmit the transmission frame 4 again (a portion indicated with i=12 in FIG. 9).

(10) Since the above two conditions of re-transmission based on the next repeat request frame number are satisfied, transmit the transmission frame 8 again (a portion indicated with i=13 in FIG. 9)

(11) Transmit the transmission frames 9 and 10 (portions indicated with i=14 and i=15 shown in FIG. 9)

(12) Since there is no transmission frame whose frame number exceeds 10 and the latest repeat request frame number stored in the memory is 4, transmit the transmission frame 4 again. Receive the feedback frame including the repeat request frame number area while transmitting the transmission frame 4. The repeat request frame number indicated by the feedback frame is 9 (a portion indicated with i=16 in FIG. 9). (13) Transmit the transmission frame 9. Receive a feedback frame including the repeat request frame number area during transmission of the transmission frame 9. Since the repeat request frame number indicated by the feedback frame is 11, determine that the reception side communication apparatus has received the transmission frame 10 correctly, and finish the transmission of the data frames.

Operation of Reception Side Communication Apparatus

The reception side communication apparatus transmits the feedback frame including the next repeat request frame number area instead of that including the repeat request frame number area every fourth time and only when the next repeat request frame number is larger than a value obtained by adding the repeat request frame number with 1.

(1) Since having received the transmission frames 1, 2 and 3 correctly, successively transmit feedback frames respectively including the repeat request frame numbers set to 2, 3 and 4 to the transmission side communication apparatus (when j=1 to 3).

(2) The reception side communication apparatus has not received the transmission frame 4 correctly. At this time, instead of transmitting j=4 at which the feedback frame including the next repeat request frame number, the next repeat request frame number does not exceed the value obtained by adding the repeat request frame number with 1, and hence the reception side communication apparatus transmits the feedback frame whose repeat request frame number is 4.

(3) Successively transmit feedback frames including repeat request frame numbers set to 4 at the timings of j=5 to 7. Since having received the transmission frames up to the transmission frame 7, the next repeat request frame number at that time is 8.

(4) Since the transmission timing is a timing of j=8 at which the feedback frame including the next repeat request frame number area is to be transmitted and since the next repeat request frame number is larger than the value obtained by adding the repeat request frame number with 1, transmit the feedback frame including the next repeat request frame number 8 instead of that including the repeat request frame number.

(5) Receive the transmission frames 8, 10 at the timings of 9 to 11. During these timings, transmit the feedback frame including the repeat request frame number area indicating the repeat request frame number 4. The next repeat request frame number at this time is 11.

(6) Correctly receive the transmission frame 4 at the timing of j=12. Since the timing of j=12 is a timing for transmission of the feedback frame including the next repeat request frame number and the next repeat request frame number is larger than the value obtained by adding the repeat request frame number with 1, transmit the feedback frame including the next repeat request frame number area indicating the repeat request frame number of 11.

(7) Since having received the transmission frames 8, 9 at the timings of j=13, 14, transmit the feedback frames respectively including the repeat request frame number areas indicating the repeat request frame numbers 9, 11.

Figure 10:
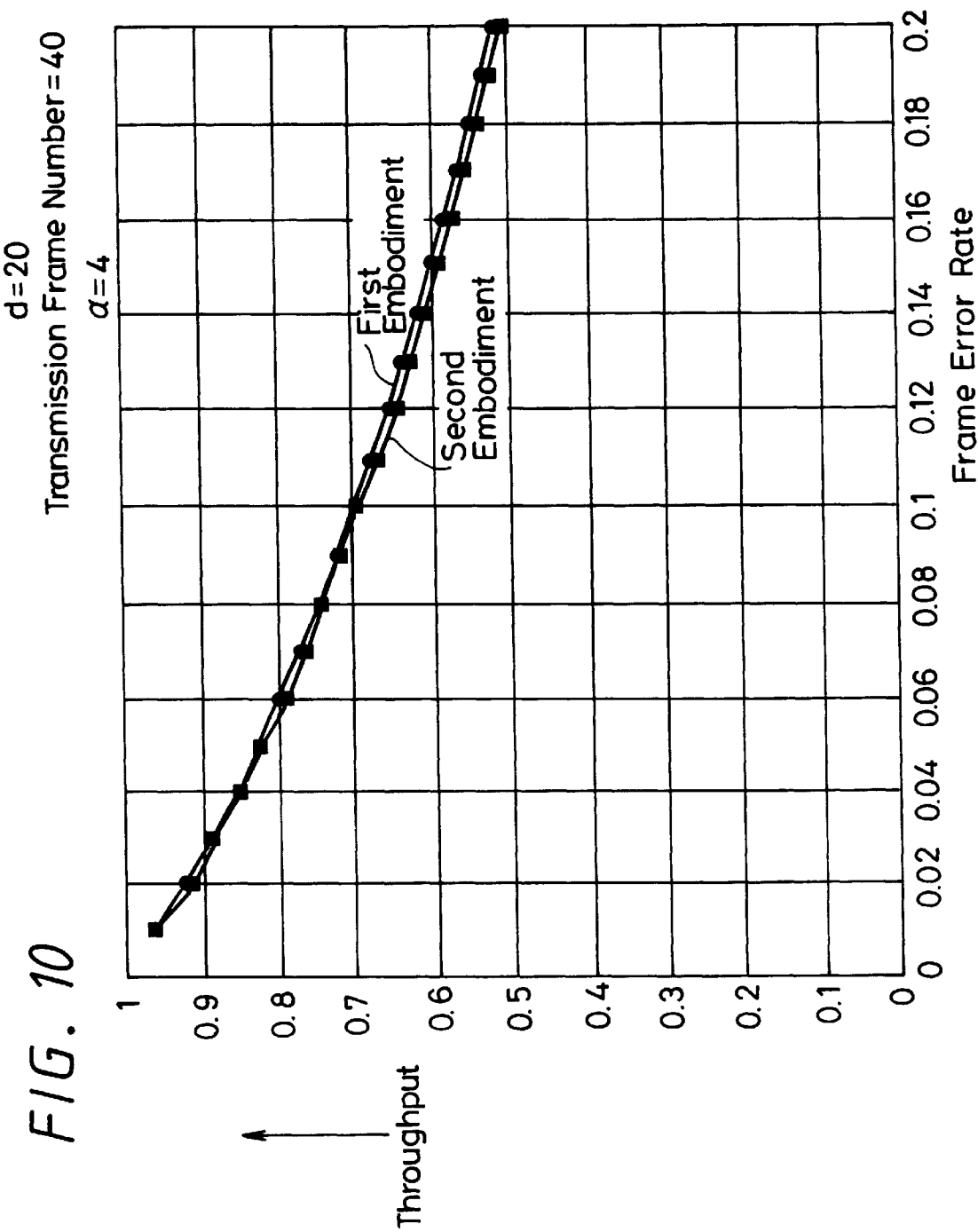
FIG. 10 is a characteristic graph of frame error rate versus throughput characteristics obtained in the first and second embodiments.

FIG. 10 is a graph showing characteristic curves of a frame error rate versus a throughput respectively obtained in the first embodiment shown in FIG. 2A and the second embodiment shown in FIG. 7A for comparison. In FIG. 10, the characteristic curves are obtained by calculating values of the throughput S respectively obtained when the frame error rate is changed from 0 to 0.2 by a intervala of 0.02. In this calculation, it is assumed that a round trip delay amount d is 20 and a total frame number is 40. Study of the characteristic graph of FIG. 10 reveals that, if the throughputs obtained at the same error rate in the first and second embodiments are compared, the throughput obtained in the second embodiment is lower as compared with that obtained in the first embodiment and that, however, the difference therebetween is very small and hence hardly influences practical data transmission. Therefore, since the data amount of the data area of the feedback frame is lowered only slightly in the second embodiment, the second embodiment is superior to the first embodiment shown in FIG. 2A with respect to this point.

In the ARQ error control method of an SR system according to the second embodiment (whose data format is shown in FIG. 7A) shown in FIGS. 8 and 9, when the transmission side communication apparatus transmits the transmission frames 1 to 10 to the reception side communication apparatus, the number N1 of the transmission frames practically transmitted is 14, while the number N2 of the transmission frames transmitted until the transmission side communication apparatus receives all the feedback frames for confirming correct transmission of all the transmission frames 1 to 10 after transmitting the first transmission frames is 17.

A throughput S defined by a ratio N0/N1 (N0 is the number of the transmission frames to be transmitted and N1 is the number of all the transmission frames practically transmitted from the transmission side communication apparatus to the reception side communication apparatus) is S=10÷14=0.714 in the second embodiment shown in FIGS. 8 and 9. Study of this result reveals that the throughput S obtained in the second embodiment is improved by about 8.9% as compared with the throughput S of 0.625 obtained in the example shown in FIG. 1B.

According to the second embodiment shown in FIG. 7A, similar to the first embodiment shown in FIG. 2A, even if the reception side communication apparatus frequently fails to correctly receive the data frames transmitted from the transmission side communication apparatus thereto at the beginning of the transmission and hence repeatedly transmits the feedback frame indicating the repeat request, then it is possible for the transmission side communication apparatus to determine which data frames the reception side communication apparatus has correctly received after the reception side communication apparatus had failed to correctly receive the data frame from the transmission side communication apparatus. Therefore, it can be avoided that the transmission side communication apparatus uselessly re-transmits again the data frames once transmitted therefrom to the reception side communication apparatus.

While the repeat request identifier area requires only 1 bit as described above when there are two kinds of the repeat request frame number areas, even if the number of the repeat request frame number areas is increased, reduction of a data capacity of the data area can be limited even with respect to the full-duplex transmission of the feedback frame including the data area containing data as compared with the first embodiment shown in FIG. 2A (e.g., the repeat request identifier area requires 2 bits when the number of the repeat request frame number areas is three or four, 3 bits when the number of the repeat request frame number areas is five or six, . . . ).

Figure 11:
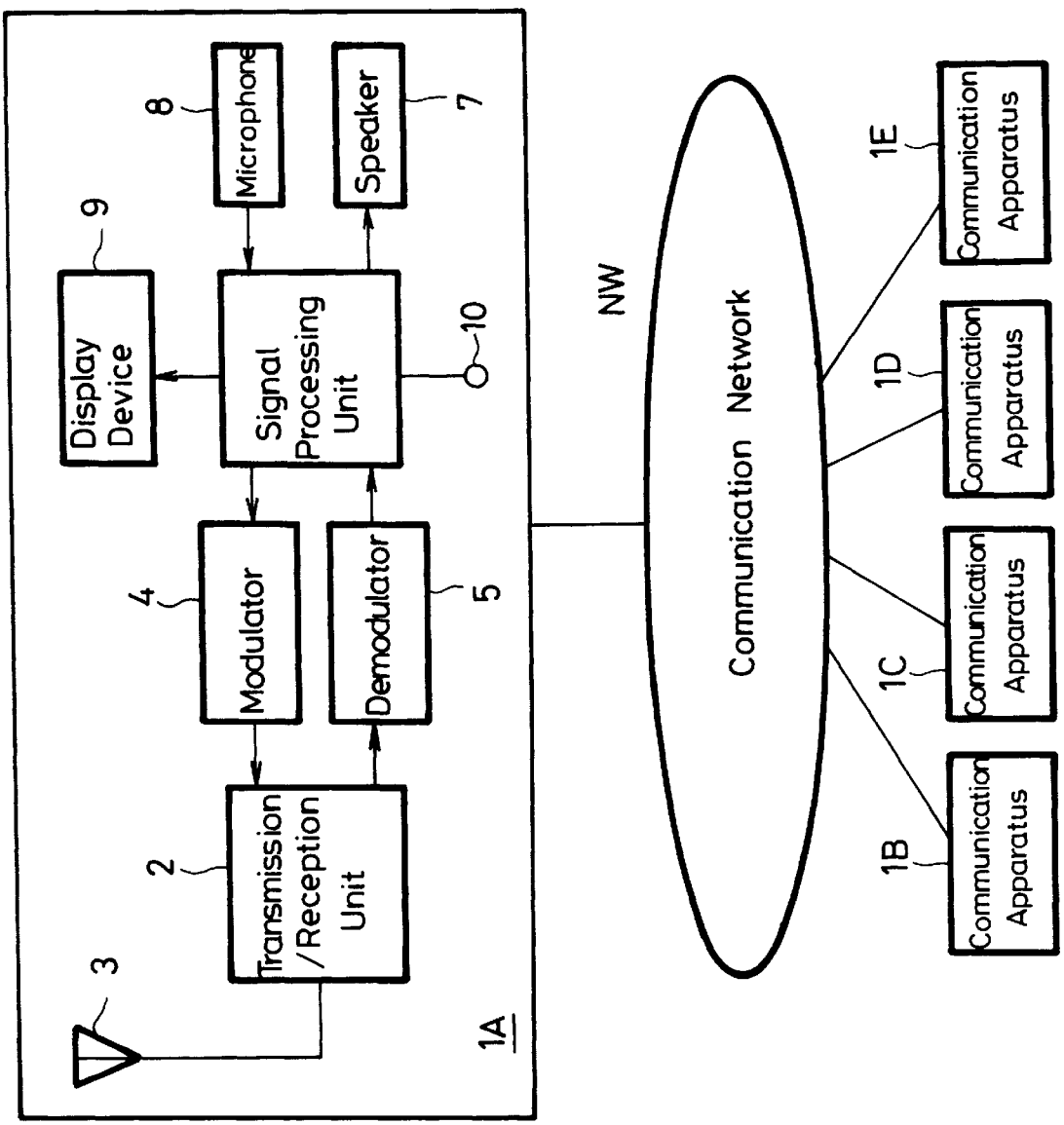
FIG. 11 is a diagram showing a communication system to which the embodiments of the present invention can be applied.

A communication system including a data communication apparatus to which the present invention can be applied will be described with reference to FIG. 11. A data communication apparatus 1A is a telephone in a personal handy-phone system (PHS), for example, which can communicate with various data communication apparatuses 1B, 1C, 1D, 1E, . . . by wireless means or through a wireless communication network NW. The data communication apparatuses 1B, 1C, 1D, 1E, . . . are a PHS telephone similar to the data communication apparatus 1A, a wireless telephone such as a cellular system telephone or the like, a wire telephone, a relay station, and a base station, or the like.

The data communication apparatus 1A has a transmission/reception unit 2, a transmission/reception antenna 3, a modulator 4 and a demodulator 5 connected to the transmission/reception unit 2, a signal processing unit 6 connected to the modulator 4 and the demodulator 5, a speaker 7 connected to the signal processing unit 6, a microphone 8 connected to the signal processing unit 6, and a display device 9 connected to the signal processing unit 6 for displaying a text, a numeric, a symbol, a figure, an image and so on (formed of a liquid-crystal display or the like). An input/output terminal 10 for external digital data is derived from the signal processing unit 6. The above-mentioned data frame transmitted from the transmission side communication apparatus to the reception side communication apparatus and the feedback frame transmitted from the above-mentioned reception side communication apparatus to the transmission side communication apparatus are respectively generated by the transmission side communication apparatus and the reception side communication apparatus which are certain data communication apparatuses, of the data communication apparatuses 1B, 1C, 1D, 1E, . . . , for communicating the other data communication apparatuses.

According to a first aspect of the present invention, in a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, the feedback frame also indicates a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}]( where k is an integer exceeding 2) in response to frame numbers of the first to nth data frames which the reception side data communication apparatus has received. Therefore, it is possible to obtain a data communication method which makes it possible to transmit the feedback frame indicating a request frame number from the reception side data communication apparatus to the transmission side data communication side apparatus with an improved throughput of the data frame transmitted from the transmission side data communication apparatus to the reception side data communication apparatus.

According to a second aspect of the present invention, in a data communication method according to the first aspect of the present invention in response to the first request frame number FB1(n) indicated by the received feedback frame and, the second to kth request frame numbers FB2(n) to FBk(n) indicated thereby, the transmission side data communication apparatus transmits data frames having the frame numbers corresponding to the frame numbers which the reception side data communication apparatus has not received to the reception side data communication apparatus. Therefore, in addition to the above effect, it is possible to obtain a data communication method which can improve the throughput of the data frames transmitted from the transmission side data communication apparatus to the reception side data communication apparatus.

According to a third aspect of the present invention, in a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame having the same format as that of the data frame and indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, if there is no transmission data to be included in the feedback frame, the feedback frame includes a data area which indicates a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) in response to frame numbers of the first to nth data frames which the reception side data communication apparatus has received. Therefore, it is possible to obtain a data communication method which makes it possible to transmit the feedback frame indicating a request frame number from the reception side data communication apparatus to the transmission side data communication side apparatus with an improved throughput of the data frame transmitted from the transmission side data communication apparatus to the reception side data communication apparatus, and which can improve the throughput of the data frames transmitted from the transmission side data communication apparatus to the reception side data communication apparatus without lowering a maximum transmission rate.

According to a fourth aspect of the present invention, in a data communication method according to the third aspect of the present invention in response to the first request frame number FB1(n) indicated by the received feedback frame and, the second to kth request frame numbers FB2(n) to FBk(n) indicated thereby, the transmission side data communication apparatus transmits data frames having the frame numbers corresponding to the frame numbers which the reception side data communication apparatus has not received correctly to the reception side data communication apparatus. Therefore, in addition to the above effect, it is possible to obtain a data communication method which can improve the throughput of the data frames transmitted from the transmission side data communication apparatus to the reception side data communication apparatus without lowering the maximum transmission rate.

According to a fifth aspect of the present invention, in a data communication apparatus employing a data communication method of the transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of first to nth data frames received, and transmitting from the transmission side data communication apparatus to the reception side data communication apparatus a data frame which the reception side data communication apparatus has not confirmed, in response to the first request frame number FB1(n) indicated by the received feedback frame, the feedback frame also indicates a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) in response to frame numbers of the first to nth data frames which the reception side data communication apparatus has received. Therefore, it is possible to obtain a data communication apparatus which makes it possible to transmit the feedback frame indicating a request frame number from the reception side data communication apparatus to the transmission side data communication side apparatus with an improved throughput of the data frame transmitted from the transmission side data communication apparatus to the reception side data communication apparatus.

According to a sixth aspect of the present invention, in a data communication apparatus according to the fifth aspect of the present invention, in response to the first request frame number FB1(n) indicated by the received feedback frame and, the second to kth request frame numbers FB2(n) to FBk(n) indicated thereby, the transmission side data communication apparatus transmits data frames having the frame numbers corresponding to the frame numbers which the reception side data communication apparatus has not received correctly to the reception side data communication apparatus. Therefore, in addition to the above effect, it is possible to obtain a data communication apparatus which can improve the throughput of the data frames transmitted from the transmission side data communication apparatus to the reception side data communication apparatus.

According to a seventh aspect of the present invention, in a data communication apparatus employing a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame having the same format as that of the data frame and indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, if there is no transmission data to be included in the feedback frame, the feedback frame includes a data area which indicates a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) in response to frame numbers of the first to nth data frames which the reception side data communication apparatus has received. Therefore, it is possible to obtain a data communication apparatus which makes it possible to transmit the feedback frame indicating a request frame number from the reception side data communication apparatus to the transmission side data communication side apparatus with an improved throughput of the data frame transmitted from the transmission side data communication apparatus to the reception side data communication apparatus, and which can improve the throughput of the data frames transmitted from the transmission side data communication apparatus to the reception side data communication apparatus without lowering a maximum transmission rate.

According to an eighth aspect of the present invention, in a data communication apparatus according to the seventh aspect of the present invention, in response to the first request frame number FB1(n) indicated by the received feedback frame and, the second to kth request frame numbers FB2(n) to FBk(n) indicated thereby, the transmission side data communication apparatus transmits data frames having the frame numbers corresponding to the frame numbers which the reception side data communication apparatus has not received correctly to the reception side data communication apparatus. Therefore, in addition to the above effect, it is possible to provide a data communication apparatus which can improve the throughput of the data frames transmitted from the transmission side data communication apparatus to the reception side data communication apparatus without lowering the maximum transmission rate.

According to a ninth aspect of the present invention, in a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, the data communication method includes a process of generating a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) in response to frame numbers of the first to nth data frames which the reception side data communication apparatus has received, processes of replacing the request frame number FB1(n) with the second request frame number FB2(n) every $\beta_1$ transmission times ($\beta_1$ is a natural number satisfying $0<\beta_1<\alpha_1$) during every $\alpha_1$ transmission times (where $\alpha_1$ is a natural number satisfying $\alpha_1>1$) of a feedback frame indicating the first request frame number FB1(n), . . . and replacing the request frame number FB(k−1)(n) with the second request frame number FBk(n) every $\beta_{(k-1)}$ transmission times ($\beta_{(k-1)}$ is a natural number satisfying $0<\beta_{(k-1)}<\alpha_{(k-1)}$) during every $\alpha_{(k-1)}$ transmission times (where $\alpha_1$ is a natural number satisfying $\alpha_{(k-1)1}>1$) of a feedback frame indicating the first request frame number FB(k−1)(n), and a process of including in the feedback frame a request identifier for indicating the first to kth request frame numbers FB1(n) to FBk(n). Therefore, an effect substantially similar to that achieved by a first aspect of the present invention can be achieved. Moreover, it is possible to obtain a data communication method which can limit a reduced amount of data capacity to only a very slight amount even in a full-duplex communication in which data is transmitted from the reception side data communication apparatus to the transmission side data communication apparatus.

According to a tenth aspect of the present invention, in a data communication method according to the ninth aspect of the present invention, the first to kth request frame numbers FB1(n) to FBk(n) based on the request frame number and the request identifier indicated by the received feedback frame are obtained and stored in a storage means, and a data frame of a frame number which the reception side data communication apparatus has not confirmed is transmitted from the transmission side data communication apparatus to the reception side data communication apparatus in response to respective latest request frame numbers of the first to kth request frame numbers FB1(n) to FBk(n) stored in the storage means. Therefore, in addition to the above effect, it is possible to obtain a data communication method which can improve the throughput of the data frames transmitted from the transmission side data communication apparatus to the reception side data communication apparatus.

According to an eleventh aspect of the present invention, in a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, the data communication method includes a process of generating a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}]( where k is an integer exceeding 2) in response to frame numbers of the first to nth data frames which the reception side data communication apparatus has received, processes of replacing the first request frame number FB1(n) included in the feedback frame with the second request frame number FB2(n) when a first predetermined condition is satisfied, . . . , and replacing the (k−1)th request frame number FB(k−1)(n) included in the feedback frame with the kth request frame number FBk(n) when a (k−1)th predetermined condition is satisfied, and a process of including in the feedback frame a request identifier indicating either of the first to kth request frame numbers FB1(n) to FBk(n). Therefore, it is possible to obtain a data communication method which can achieve an effect substantially similar to that achieved by the ninth aspect of the present invention.

According to a twelfth aspect of the present invention, in a data communication method according to the eleventh aspect of the present invention, the first to kth request frame numbers FB1(n) to FBk(n) based on the request frame number and the request identifier indicated by the received feedback frame are obtained and stored in a storage means, and a data frame of a frame number which the reception side data communication apparatus has not confirmed is transmitted from the transmission side data communication apparatus to the reception side data communication apparatus in response to respective latest request frame numbers of the first to kth request frame numbers FB1(n) to FBk(n) stored in the storage means. Therefore, it is possible to provide a data communication method which can achieve an effect substantially similar to that achieved by the tenth aspect of the present invention.

According to a thirteenth aspect of the present invention, in a data communication apparatus employing a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1 )}] (where k is an integer exceeding 2) are generated in response to frame numbers of the first to nth data frames which the reception side data communication apparatus has received. The first request frame number FB1(n) is replaced with the second request frame number FB2(n) every $\beta_1$ transmission times ($\beta_1$ is a natural number satisfying $0<\beta_1<\alpha_1$) during every $\alpha_1$ transmission times (where $\alpha_1$ is a natural number satisfying $\alpha_1>1$) of a feedback frame indicating the first request frame number FB1(n), . . . and the (k−1)th request frame number FB(k−1)(n) is replaced with the kth request frame number FBk(n) every $\beta_{(k-1)}$ transmission times (where $\beta_{(k-1)}$ is a natural number satisfying $0<\beta_{(k-1)}<\alpha_{(k-1)}$ during every $\alpha_{(k-1)}$ transmission times (where $\alpha_1$ is a natural number satisfying $\alpha_{(k-1)1}>1$) of a feedback frame indicating the (k−1)th request frame number FB(k−1)(n). The request identifier indicating either of the first to kth request frame numbers FB1(n) to FBk(n) are included in the feedback frame a. Therefore, an effect substantially similar to that achieved by a first aspect of the present invention can be achieved. Moreover, it is possible to obtain a data communication method which can limit a reduced amount of data capacity to only a very slight amount even in a full-duplex communication in which data is transmitted from the reception side data communication apparatus to the transmission side data communication apparatus.

According to a fourteenth aspect of the present invention, in a data communication apparatus according to the thirteenth aspect of the present invention, the first to kth request frame numbers FB1(n) to FBk(n) are obtained based on the request frame number and the request identifier indicated by the received feedback frame to be stored in a storage means, and a data frame of a frame number which the reception side data communication apparatus has not confirmed is transmitted from the transmission side data communication apparatus to the reception side data communication apparatus in response to respective latest request frame numbers of the first to kth request frame numbers FB1(n) to FBk(n) stored in the storage means. Therefore, in addition to the above effect, it is possible to obtain a data communication apparatus which can improve the throughput of the data frames transmitted from the transmission side data communication apparatus to the reception side data communication apparatus.

According to a fifteenth aspect of the present invention, in a data communication apparatus employing a data communication method of transmitting data frames from a first predetermined frame number to a last predetermined frame number from a transmission side data communication apparatus to a reception side data communication apparatus in an ascending order (or a descending order), transmitting from the reception side data communication apparatus to the transmission side data communication apparatus a feedback frame indicating a first request frame number FB1(n) formed of a minimum (or maximum) frame number FBM(n) among the frame numbers of data frames which have not been received in response to frame numbers of the first to nth data frames received, and transmitting from the transmission side data communication apparatus to the reception side data communication apparatus a data frame which the reception side data communication apparatus has not confirmed, in response to the first request frame number FB1(n) indicated by the received feedback frame, a second repeat frame number FB2(n) formed of a frame number {FBM(n)+1} [or {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) are generated in response to frame numbers of the first to nth data frames which the reception side data communication apparatus has received. The request frame number FB1(n) included in the feedback frame is replaced with the second request frame number FB2(n) when a first predetermined condition is satisfied, . . . , and the (k−1)th request frame number FB(k−1)(n) is replaced with the kth request frame number FBk(n) when a (k−1)th condition is satisfied. A request identifier for indicating the first to kth request frame numbers FB1(n) to FBk(n) is included in the feedback frame a. Therefore, it is possible to obtain a data communication apparatus which can achieve an effect substantially similar to that achieved by the thirteenth aspect of the present invention.

According to a sixteenth aspect of the present invention, in a data communication apparatus according to the fifteenth aspect of the present invention, the first to kth request frame numbers FB1(n) to FBk(n) are obtained based on the request frame number and the request identifier indicated by the received feedback frame to be stored in a storage means, and a data frame of a frame number which the reception side data communication apparatus has not confirmed is transmitted from the transmission side data communication apparatus to the reception side data communication apparatus in response to respective latest request frame numbers of the first to kth request frame numbers FB1(n) to FBk(n) stored in the storage means. Therefore, it is possible to obtain a data communication apparatus which can achieve an effect substantially similar to that achieved by the fourteenth aspect of the present invention.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A data communication method for use with a transmission side data communication apparatus and a reception side data communication apparatus, the method comprising the steps of:

transmitting data frames from a first predetermined frame number to a last predetermined frame number from said transmission side data communication apparatus to said reception side data communication apparatus in one of an ascending order and a descending order;

transmitting from said reception side data communication apparatus to said transmission side data communication apparatus, in response to each latest data frame received by said reception side data communication apparatus, a corresponding feedback frame indicating a first repeat request frame number FB1(n) formed of one of a minimum and a maximum frame number FBM(n), corresponding to said one of said ascending order and said descending order, among frame numbers of data frames which have not been received, and also indicating a second repeat request frame number FB2(n) formed of a next one of a frame number {FBM(n)+1} and {FBM(n)−1}, corresponding to said one of said ascending order and said descending order, among the frame numbers of data frames which have not been received; and transmitting from said transmission side data communication apparatus to said reception side data communication apparatus a data frame which said reception side data communication apparatus has not confirmed, in response to each latest feedback frame received by said transmission side data communication apparatus which indicates said first repeat request frame number FB1(n) and said second repeat frame number FB2(n).

2. The data communication method according to claim 1, wherein, in response to said first repeat request frame number FB1(n) and said second repeat request frame number FB2(n) indicated by said feedback frame, said transmission side data communication apparatus transmits one of the data frames having the indicated frame numbers which said reception side data communication apparatus has not received to said reception side data communication apparatus.

3. A data communication method for use with a transmission side data communication apparatus and a reception side data communication apparatus, the method comprising the steps of:

transmitting data frames from a first predetermined frame number to a last predetermined frame number from said transmission side data communication apparatus to said reception side data communication apparatus in one of an ascending order and a descending order;

transmitting from said reception side data communication apparatus to said transmission side data communication apparatus a feedback frame having a same format as that of a data frame and indicating a first request frame number FB1(n) formed of one of a minimum and a maximum frame number FBM(n) among frame numbers of data frames which have not been received in response to frame numbers of received first to nth data frames; and transmitting from said transmission side data communication apparatus to said reception side data communication apparatus a data frame which said reception side data communication apparatus has not confirmed, in response to said first request frame number FB1(n) indicated by said feedback frame, wherein, if there is no transmission data to be included in said feedback frame, said feedback frame includes a data area for indicating a second request frame number FB2(n) formed of one of a frame number {FBM(n)+1} [and {FBM(n)−1}] among the frame numbers of data frames which have not been received to a kth request frame number FBk(n) formed of a frame number {FBM(n)+(k−1)} [or {FBM(n)−(k−1)}] (where k is an integer exceeding 2) in response to frame numbers of said first to nth data frames which said reception side data communication apparatus has received.

4. The data communication method according to claim 3, wherein, in response to said first request frame number FB1(n) indicated by said feedback frame and said second to kth request frame numbers FB2(n) to FBk(n) also indicated by said feedback frame, said transmission side data communication apparatus transmits data frames having indicated frame numbers which said reception side data communication apparatus has not correctly received to said reception side data communication apparatus.

5. A data communication apparatus serving as a transmission side data communication apparatus and a reception side data communication apparatus and employing a data communication method of transmitting data frames from a first predetermined frame number to a last predetermined frame number from said transmission side data communication apparatus to said reception side data communication apparatus in one of an ascending order and a descending order, transmitting from said reception side data communication apparatus to said transmission side data communication apparatus a feedback frame, and transmitting from said transmission side data communication apparatus to said reception side data communication apparatus a data frame which said reception side data communication apparatus has not confirmed, in response to said feedback frame, said data communication apparatus comprising:

a signal processing unit for processing a transmission frame when said data communication apparatus serves as said transmission side data communication apparatus and for processing said feedback frame when said data communication apparatus serves as said reception side data communication apparatus, wherein said data communication apparatus serving as said reception side data communication apparatus transmits, in response to each latest data frame received by said reception side data communication apparatus, a corresponding feedback frame, the feedback frame indicating a first repeat request frame number FB1(n) formed of one of a minimum and a maximum frame number FBM(n), corresponding to said one of said ascending order and said descending order, among frame numbers of data frames which have not been received, and also indicating a second repeat request frame number FB2(n) formed of a next one of a frame number {FBM(n)+1} and {FBM(n)−1} among the frame numbers of data frames which have not been received, and said data communication apparatus serving as said transmission side data communication apparatus, in response to each latest feedback frame received by said transmission side data communication apparatus, transmits one of the data frames corresponding to said reseat request frame numbers FB1(n) to FB2(n) indicated by the latest feedback frame.

6. The data communication apparatus according to claim 5, wherein said feedback frame has a same format as said data frames.

7. A data communication apparatus serving as a transmission side data communication apparatus and a reception side data communication apparatus and employing a data communication method of transmitting data frames from a first predetermined frame number to a last predetermined frame number from said transmission side data communication apparatus to said reception side data communication apparatus in one of an ascending order and a descending order, transmitting from said reception side data communication apparatus to said transmission side data communication apparatus a feedback frame, and transmitting from said transmission side data communication apparatus to said reception side data communication apparatus a data frame which said reception side data communication apparatus has not confirmed, in response to said feedback frame, said data communication apparatus comprising:

a signal processing unit for processing a transmission frame when said data communication apparatus serves as said transmission side data communication apparatus and for processing a feedback frame when said data communication apparatus serves as said reception side data communication apparatus, wherein said data communication apparatus serving as said reception side data communication apparatus, in response to each latest data frame received by said reception side data communication apparatus, transmits a corresponding feedback frame, the feedback frame having a same format as that of said data frames and indicating a first repeat request frame number FB1(n) formed of one of a minimum and a maximum frame number FBM(n), corresponding to said one of said ascending order and said descending order, among frame numbers of data frames which have not been received, and, if there is no transmission data to be included in said feedback frame, the feedback frame including a data area for indicating a second repeat request frame number FB2(n) formed of a next one of a frame number {FBM(n)+1} and {FBM(n)−1} among the frame numbers of data frames which have not been received to a kth request frame number FBk(n) formed of one of a frame number {FBM(n)+(k−1)} and {FBM(n)−(k−1)} (where k is an integer exceeding 2) in response to frame numbers of said first to nth data frames which said reception side data communication apparatus has received, and said data communication apparatus serving as said transmission side data communication apparatus, in response to each latest feedback frame received by said transmission side data communication apparatus, transmits one of the data frames corresponding to said repeat request frame numbers FB1(n) to FBk(n) indicated by the latest feedback frame.

8. The data communication apparatus according to claim 7, wherein, in response to said first repeat request frame number FB1(n) indicated by said feedback frame and said second to kth repeat request frame numbers FB2(n) to FBk(n) also indicated by said feedback frame, said transmission side data communication apparatus transmits one of the data frames indicated by said repeat request frame numbers FB1(n) and FB2(n) which said reception side data communication apparatus has not correctly received to said reception side data communication apparatus.

9. A data communication method of transmitting data frames from a first predetermined frame number to a last predetermined frame number from a transmission side data communication apparatus to a reception side data communication apparatus in one of an ascending order and a descending order, transmitting from said reception side data communication apparatus to said transmission side data communication apparatus a feedback frame, and transmitting from said transmission side data communication apparatus to said reception side data communication apparatus a data frame which said reception side data communication apparatus has not confirmed, in response to said feedback frame, said method comprising the steps of:

generating a first repeat request frame number FB1(n) formed of one of a minimum and a maximum frame number FBM(n), corresponding to said one of said ascending order and said descending order, among frame numbers of data frames which have not been received and a second repeat request frame number FB2(n) formed of a next one of a frame number {FBM(n)+1} and {FBM(n)−1} among the frame numbers of data frames which have not been received to a kth reseat request frame number FBk(n) formed of one of a frame number {FBM(n)+(k−1)} and {FBM(n)−(k−1)} (where k is an integer exceeding 2) in response to frame numbers of said first to nth data frames which said reception side data communication apparatus has received;

replacing said first repeat request frame number FB1(n) with said second reseat request frame number FB2(n) every $\beta_1$ transmission times (where $\beta_1$ is a natural number satisfying $0<\beta_1<\alpha_1$) during every $\alpha_1$ transmission times (where $\alpha_1$ is a natural number satisfying $\alpha_1>1$) of said feedback frame indicating said first repeat request frame number FB1(n) and replacing a (k−1)th repeat request frame number FB(k−1)(n) with said kth repeat request frame number FBk(n) at every $\beta_{(k-1)}$ transmission times (where $\beta_{(k-1)}$ is a natural number satisfying $0<\beta_{(k-1)}<\alpha_{(k-1)}$) during every $\alpha_{(k-1)}$ transmission times (where $\alpha_{(k-1)}$ is a natural number satisfying $\alpha_{(k-1)1}>1$) of said feedback frame indicating said first repeat request frame number FB1(n); and including in said feedback frame a request identifier for indicating said first to kth repeat request frame numbers FB1(n) to FBk(n), wherein said reception side data communication apparatus, in response to each latest data frame received by said reception side data communication apparatus, transmits a corresponding feedback frame which indicates said first to kth repeat request frame numbers FB1(n) to FBk(n), and said transmission side data communication apparatus, in response to each latest feedback frame received by said transmission side data communication apparatus, transmits one of the data frames corresponding to said repeat request frame numbers FB1(n) to FBk(n) indicated by the latest feedback frame.

10. The data communication method according to claim 9, further comprising the steps of:

obtaining said first to kth repeat request frame numbers FB1(n) to FBk(n) based on a repeat request frame number and said request identifier indicated by said feedback frame and storing said repeat request frame numbers FB1(n) to FBk(n) in a storage element; and transmitting a data frame of a frame number, which said reception side data communication apparatus has not confirmed, from said transmission side data communication apparatus to said reception side data communication apparatus in response to respective latest repeat request frame numbers of said first to kth repeat request frame number FB1(n) to FBk(n) stored in said storage element.

11. A data communication method of transmitting data frames from a first predetermined frame number to a last predetermined frame number from a transmission side data communication apparatus to a reception side data communication apparatus in one of an ascending order and a descending order, transmitting from said reception side data communication apparatus to said transmission side data communication apparatus a feedback frame, and transmitting from said transmission side data communication apparatus to said reception side data communication apparatus a data frame which said reception side data communication apparatus has not confirmed, in response to said feedback frame, said method comprising the steps of:

generating a first repeat request frame number FB1(n) formed of one of a minimum and a maximum frame number FBM(n), corresponding to said one of said ascending order and said descending order, among frame numbers of data frames which have not been received and a second repeat request frame number FB2(n) formed of a next one of a frame number {(FBM(n)+1} and {FBM(n)−1} among the frame numbers of data frames which have not been received to a kth repeat request frame number FBk(n) formed of one of a frame number {FBM(n)+(k−1)} and {FBM(n)−(k−1)} (where k is an integer exceeding 2) in response to frame numbers of said first to nth data frames which said reception side data communication apparatus has received;

replacing said first reseat request frame number FB1(n) included in said feedback frame with said second repeat request frame number FB2(n) when a first predetermined condition is satisfied and replacing a (k−1)th repeat request frame number FB(k−1)(n) included in said feedback frame with said kth repeat request frame number FBk(n) when a (k−1)th predetermined condition is satisfied; and including in said feedback frame a request identifier for indicating said first to kth repeat request frame numbers FB1(n) to FBk(n), wherein said reception side data communication apparatus, in response to each latest data frame received by said reception side data communication apparatus, transmits a corresponding feedback frame which indicates said first to kth repeat request frame numbers FB1(n) to FBk(n), and said transmission side data communication apparatus, in response to each latest feedback frame received by said transmission side data communication apparatus, transmits one of the data frames corresponding to said repeat request frame numbers FB1(n) to FBk(n) indicated by the latest feedback frame.

12. The data communication method according to claim 11, further comprising the steps of:

obtaining said first to kth repeat request frame numbers FB1(n) to FBk(n) based on a repeat request frame number and said request identifier indicated by said feedback frame and storing said repeat request frame numbers in a storage element; and transmitting said data frame of a frame number, which said reception side data communication apparatus has not confirmed, from said transmission side data communication apparatus to said reception side data communication apparatus in response to respective latest repeat request frame numbers of said first to kth repeat request frame numbers FB1(n) to FBk(n) stored in said storage element.

13. A data communication apparatus for use with a transmission side data communication apparatus a reception side data communication apparatus and employing a data communication method of transmitting data frames from a first predetermined frame number to a last predetermined frame number from said transmission side data communication apparatus to said reception side data communication apparatus in one of an ascending order and a descending order, transmitting from said reception side data communication apparatus to said transmission side data communication apparatus a feedback frame, and transmitting from said transmission si de data communication apparatus to said reception side data communication apparatus a data frame which said reception side data communication apparatus has not confirmed, in response to said feedback frame, said data communication apparatus comprising:

a signal processing unit for generating a first repeat request frame number FB1(n) formed of one of a minimum and a maximum frame number FBM(n), corresponding to said one of said ascending order and said descending order, among frame numbers of data frames which have not been received and a second repeat request frame number FB2(n) formed of one of a frame number {FBM(n)+1} and {FBM(n)−1} among the frame numbers of data frames which have not been received to a kth repeat request frame number FBk(n) formed of one of a frame number {FBM(n)+(k−1)} and {FBM(n)−(k−1)} (where k is an integer exceeding 2) in response to frame numbers of said first to nth data frames which said reception side data communication apparatus has received, wherein said signal processing unit replaces said first repeat request frame number FB1(n) with said second repeat request frame number FB2(n) every $\beta_1$ transmission times (where $\beta_1$ is a natural number satisfying $0<\beta_1 21\ \alpha_1$) during every $\alpha_1$ transmission times (where $\alpha_1$ is a natural number satisfying $\alpha_1>1$) of said feedback frame indicating said first repeat request frame number FB1(n) and replaces a (k−1)th repeat request frame number FB(k−1)(n) with said kth repeat request frame number FBk(n) every $\beta_{(k-1)}$ transmission times (where $\beta_{(k-1)}$ is a natural number satisfying $0<\beta_{(k-1)}<\alpha_{(k-1)}$) during every $\alpha_{(k-1)}$ transmission times (where $\alpha_{(k-1)}$ is a natural number satisfying $\alpha_{(k-1)1}>1$) of said feedback frame indicating said (k−1)th repeat request frame number FB(k−1)(n), said signal processing unit includes in said feedback frame a request identifier for indicating said first to kth repeat request frame numbers FB1(n) to FBk(n), said reception side data communication apparatus, in response to each latest data frame received by said reception side data communication apparatus, transmits a corresponding feedback frame which indicates said first to kth repeat request frame numbers FB1(n) to FBk(n), and said transmission side data communication apparatus, in response to each latest feedback frame received by said transmission side data communication apparatus, transmits one of the data frames corresponding to said repeat request frame numbers FB1(n) to FBk(n) indicated by the latest feedback frame.

14. The data communication apparatus according to claim 13, wherein said first to kth repeat request frame numbers FB1(n) to FBk(n) are obtained based on a repeat request frame number and said request identifier indicated by said feedback frame to be stored in a storage element and said data frame of a frame number which said reception side data communication apparatus has not confirmed is transmitted from said transmission side data communication apparatus to said reception side data communication apparatus in response to respective latest repeat request frame numbers of said first to kth repeat request frame numbers FB1(n) to FBk(n) stored in said storage element.

15. A data communication apparatus for use with a transmission side data communication apparatus and a reception side data communication apparatus and employing a data communication method of transmitting data frames from a first predetermined frame number to a last predetermined frame number from said transmission side data communication apparatus to said reception side data communication apparatus in one of an ascending order and a descending order, transmitting from said reception side data communication apparatus to said transmission side data communication apparatus a feedback frame, and transmitting from said transmission side data communication apparatus to said reception side data communication apparatus a data frame which said reception side data communication apparatus has not confirmed, in response to said feedback frame, said data communication apparatus comprising:

a signal processing unit for generating a first repeat request frame number FB1(n) formed of one of a minimum and a maximum frame number FBM(n), corresponding to said one of said ascending order and said descending order, among frame numbers of data frames which have not been received and a second repeat request frame number FB2(n) formed of one of a frame number {FBM(n)+1} and {FBM(n)−1} among the frame numbers of data frames which have not been received to a kth repeat request frame number FBk(n) formed of one of a frame number {FBM(n)+(k−1)} and {FBM(n)−(k−1)} (where k is an integer exceeding 2) in response to frame numbers of said first to nth data frames which said reception side data communication apparatus has received, wherein said signal processing unit replaces said first repeat request frame number FB1(n) included in said feedback frame with said second repeat request frame number FB2(n) when a first predetermined condition is satisfied and replaces a (k−1)th repeat request frame number FB(k−1)(n) with said kth repeat request frame number FBk(n) when a (k−1)th condition is satisfied, said signal processing unit includes in said feedback frame a request identifier indicating either of said first to kth repeat request frame numbers FB1(n) to FBk(n), said reception side data communication apparatus, in response to each latest data frame received by said reception side data communication apparatus, transmits a corresponding feedback frame which indicates said first to kth repeat request frame numbers FB1(n) to FBk(n), and said transmission side data communication apparatus, in response to each latest feedback frame received by said transmission side data communication apparatus, transmits one of the data frames corresponding to said repeat request frame numbers FB1(n) to FBk(n) indicated by the latest feedback frame.

16. The data communication apparatus according to claim 15, wherein said first to kth repeat request frame numbers FB1(n) to FBk(n) are obtained based on a repeat request frame number and said request identifier indicated by said feedback frame to be stored in a storage element and said data frame of a frame number which said reception side data communication apparatus has not confirmed is transmitted from said transmission side data communication apparatus to said reception side data communication apparatus in response to respective latest repeat request frame numbers of said first to kth repeat request frame numbers FB1(n) to FBk(n) stored in said storage element.

* * * * *